United States Patent [19]
Stevens et al.

[11] Patent Number: 5,842,577
[45] Date of Patent: Dec. 1, 1998

[54] METHOD AND APPARATUS FOR SORTING AND ACQUIRING IMAGE DATA FOR DOCUMENTS

[75] Inventors: Albert F. Stevens, Moorestown; Mark A. Stevens, Medford; Robert R. DeWitt, Marlton; George L. Hayduchok, Mt. Holly; Edward Cohen, Mt. Laurel, all of N.J.

[73] Assignee: Opex Corporation, Moorestown, N.J.

[21] Appl. No.: 687,704

[22] Filed: Jul. 26, 1996

[51] Int. Cl.$^6$ .................................................. B07C 5/02
[52] U.S. Cl. ........................ 209/3.3; 209/569; 209/583; 209/587
[58] Field of Search ............................ 209/3.1, 3.2, 583, 209/587, 567, 569, 939, 3.3

[56] References Cited

U.S. PATENT DOCUMENTS

| | | |
|---|---|---|
| 3,173,533 | 3/1965 | Zuck . |
| 4,388,994 | 6/1983 | Suda et al. . |
| 4,764,978 | 8/1988 | Kallin et al. . |
| 4,863,037 | 9/1989 | Stevens et al. . |
| 5,240,116 | 8/1993 | Stevens et al. . |
| 5,293,431 | 3/1994 | Hayduchok et al. . |
| 5,310,062 | 5/1994 | Stevens et al. . |
| 5,441,159 | 8/1995 | DeWitt et al. .......................... 209/3.1 X |
| 5,460,273 | 10/1995 | Stevens et al. . |
| 5,518,121 | 5/1996 | Stevens et al. ........................ 209/3.1 X |

*Primary Examiner*—David H. Bollinger
*Attorney, Agent, or Firm*—Dann, Dorfman, Herrell & Skillman, P.C.

[57] ABSTRACT

An apparatus is provided for sorting a group of documents contained with an envelope into selected batches of documents. An envelope feeder feeds a group of envelopes containing documents onto a document transport. A document extractor positioned along the path of movement extracts the documents from the envelopes. A system controller identifies the documents extracted from each respective envelope as a single transaction along the path of movement. An orientation detector including a magnetic image reader and an optical image reader determines the orientation of selected documents along the path of movement. A document orientor changes the orientation of documents along the path of movement into a desired orientation. A document feeder is positioned downstream from the envelope feeder to selectively feed batch identification pieces into the path of movement. An image acquisition device acquires an image of the batch identification pieces and selected documents conveyed along the path of movement to enable the system controller to assign documents of selected transactions into selected batches. A non-volatile image storage medium stores the acquired images of the selected documents. A document sorter sorts the documents of respective batches into selected output areas.

150 Claims, 21 Drawing Sheets

METHOD AND APPARATUS FOR SORTING AND ACQUIRING IMAGE DATA FOR DOCUMENTS

FIELD OF THE INVENTION

The present invention relates to a system and method for processing mail and, more specifically, to an apparatus and method for extracting, reordering, reorienting, imaging and sorting documents, and particularly remittance transactions in the form of an invoice and an accompanying check.

BACKGROUND OF THE INVENTION

Automated and semi-automated machines have been employed for processing documents such as bulk mail. Due to the large quantity of mail received by many companies, there has long been a need for efficient sorting of incoming mail. In this regard, document sorting has become particularly important in the area of remittance processing.

Utility companies, phone companies, and credit card companies routinely receive thousands of payment envelopes from their customers on a daily basis. Typically, a customer payment envelope contains an invoice stub and some type of customer payment, usually in the form of a bank check or money order. The contents of each envelope are generally referred to as a transaction, and may consist of one or more documents including one or more invoice and/or one or more check. The most common transaction consists of a single invoice stub and an accompanying payment check.

According to conventional methods of automated or semi-automated remittance processing, the documents, such as an invoice and an accompanying check, are processed by being extracted from the envelopes, placed in the proper sequence and orientation, and then stacked into groups or batches of documents. The extraction, sequencing and orienting of the invoices and checks has been effected both manually and by the use of automated or semi-automated equipment. Once arranged in stacks, the sequenced and oriented invoices and checks are then separated into groups of documents. This grouping, referred to as batching, is typically performed manually by inserting batch tickets into the stacks of documents to physically define selected batches of documents. The stacks of batched invoices and checks are then transferred to a separate remittance processing device and fed through the device multiple times to effect the necessary remittance processing. Because the stacks of invoices and checks are transferred to a separate remittance processing device after the documents have been extracted form the envelopes, errors may arise in determining which documents belong to which distinct transaction. Errors may arise in defining transactional boundaries because the documents have already been separated from the envelopes that physically and accurately define the boundaries for each transaction before processing is commenced on a remittance processing apparatus. Therefore, the remittance processing apparatus must attempt to determine the transitional boundaries based on the sequence of the documents that are fed through the apparatus. If the sequence of documents is not predetermined and precisely maintained, the transactional boundaries may be misplaced. For example, if more than one check is enclosed with a single invoice, it becomes difficult after the extraction has already been performed to ascertain whether the additional check should be included with the preceding or the following transactional documents. As a result, a check from one transaction may be processed erroneously with an invoice from another transaction.

Other problems may also arise whenever the invoices and the checks are not in proper uniform sequence or in the proper orientation. For example, the lack of proper sequencing and orientation may cause misreads or errors during a remittance processing run. If a check is being read instead of an invoice due to an improper sequence, the appropriate information will not appear at the proper location on the document during document imaging. Likewise, if a check is not in its proper orientation, an image of the back of the check may be misread as the front of the check. In accordance with the present invention, an apparatus and method are provided for extracting documents from envelopes, reordering and reorienting the documents, and imaging and storing data regarding the documents so that the association among the documents in the transactions is known during subsequent remittance processing and the proper images are acquired and stored for the selected orientation of the document.

SUMMARY OF THE INVENTION

In accordance with the present invention, an apparatus is provided for sorting a group of documents contained within envelopes into selected batches of documents. More specifically, the apparatus functions to sort a selected group of documents such as an invoice and an accompanying check contained within a remittance payment envelope into selected batches of invoices and checks. Appropriate image data is acquired and stored such as the MICR line of a check and the OCR line of an invoice.

To effect document processing, a document transport is provided for conveying the documents and the envelopes containing such documents along a selected path of movement. To input the envelopes onto the document transport, an envelope feeder is provided. The envelope feeder may be configured to hold a selected group of envelopes in position so that the envelopes may be fed in a serial manner onto the document transport. Unopened or partially unopened envelopes may be conveyed by the document transport through a series of testing stations to enable the detection of any non-conforming envelopes that fail to meet selected test criteria. For example, the envelopes may be conveyed through a thickness detector to determine whether any envelopes are too thick for further processing as well as a metal detector to determine whether any envelopes contain paper clips that could jam the apparatus. Any nonconforming envelopes may be outsorted from the apparatus. Envelopes that meet the selected test criteria are conveyed to the document transport along the selected path of movement for further processing.

An extractor is positioned along the path of movement for extracting the documents from the envelopes. Typically, the extractor may include a series of envelope edge cutters in order to cut open selected edges of each envelope to enable the document contents to be removed therefrom. If a proper extraction is effected, the envelope is discarded and the extracted documents are conveyed by the document transport along the selected path of movement. If the extraction is improper, the document may be reunited with the envelope and outsorted to a selected output area.

A system controller is provided for identifying the set of documents, such as an invoice and an accompanying check, extracted from each respective envelope as a single distinct transaction along the path of movement. The system controller also serves to monitor and maintain distinct transactional boundaries between successive transactions of documents. The system controller also controls image acquisition of selected documents and the storage of such information.

An orientation detector is positioned along the path of movement to determine the orientation of documents conveyed along the path of movement. Optionally, documents that have previously been extracted from envelopes, such as by manual extraction, may be fed directly to the orientation detector for processing. The orientation detector may include, for example, an optical detector device, such as a camera, for acquiring optical images of selected documents. In addition, the orientation detector may include a magnetic image reader for reading selected magnetic images or magnetic patterns from documents conveyed along the path of movement. A document orientor is provided for selectively changing the orientation of documents along the path of movement into a desired orientation along the path of movement. For example, the document orientor may include a document reverser for reversing the document from back to front along the path of movement, as well as a document inverter for inverting the document from top to bottom along the path of movement. As such, the document orientor functions to selectively change documents from an upside-down orientation into a right-side-up orientation and from a face-backward orientation to a face-forward orientation along the path of movement. The document orientor may also include a document reordering mechanism for changing the order of successive documents along the path of movement. More specifically, the document reordering mechanism functions to enable a trailing document to become a leading document and a leading document to then become the trailing document along the path of movement. In general, the document orientor functions to ensure that each type of document is positioned in the same orientation along the path of movement and that document pairs in each defined transaction are in a desired sequence such as invoice-check.

A separate document feeder may be positioned downstream from the envelope feeder for selectively feeding batch identification pieces, in the form of batch index cards, into the path of movement. The document feeder may also function to feed additional stacks of documents into the apparatus.

An image acquisition device is employed for acquiring an image of the batch identification pieces and selected documents conveyed along the path of movement to enable the system controller to assign documents of selected transactions into selected batches of documents. If a selected document image meets a predetermined criteria, the transaction containing the selected document may be assigned to a selected batch by the system controller. If, however, the document image fails to meet a selected criteria, e.g. the document is not readable, then the system controller may assign the respective transaction into a non-conforming group of documents.

An image storage medium, in the form of a non-volatile storage medium, is provided for storing the acquired images of the selected documents for subsequent remittance processing. A document sorter functions to sort documents of selected batches into selected output areas. A printer may also be employed along the path of movement for printing selected information on selected documents. For example, the printer may be utilized to print batch identification information such as a batch number, a transaction number and a document number on selected documents, such as checks or invoices, in response to the batch identification pieces conveyed along the path of movement.

A method in accordance with the present invention is also provided for sorting a group of documents contained within envelopes into selected batches of documents. Pursuant to the method, documents contained within the envelopes may initially be extracted from the envelopes so that the set of documents extracted from each individual envelope is identified and tracked as a single distinct transaction. The extracted documents are conveyed along a path of movement and the orientation of selected documents along the path of movement is then determined. The orientation of selected documents may be determined by acquiring optical or magnetic images from selected areas of the documents. The documents are then selectively oriented along the path of movement into a desired orientation along the path of movement. Orienting documents into the desired orientation may included reversing documents from front to back or inverting or flipping documents from top to bottom along the path of movement. The sequence of selected documents may also be changed along the path of movement. An image of selected documents is acquired and selected transactions of documents are assigned into selected batches. The acquired images of the selected documents are stored and the documents are sorted into the respective batches. Batch identification pieces may be fed into the selected path of movement to identify selected batches into which selected documents may be grouped.

DETAILED DESCRIPTION OF THE DRAWINGS

The foregoing summary as well as the following detailed description of the preferred embodiments of the present invention will be better understood when read in conjunction with the appended drawings, in which.

Figure 1:
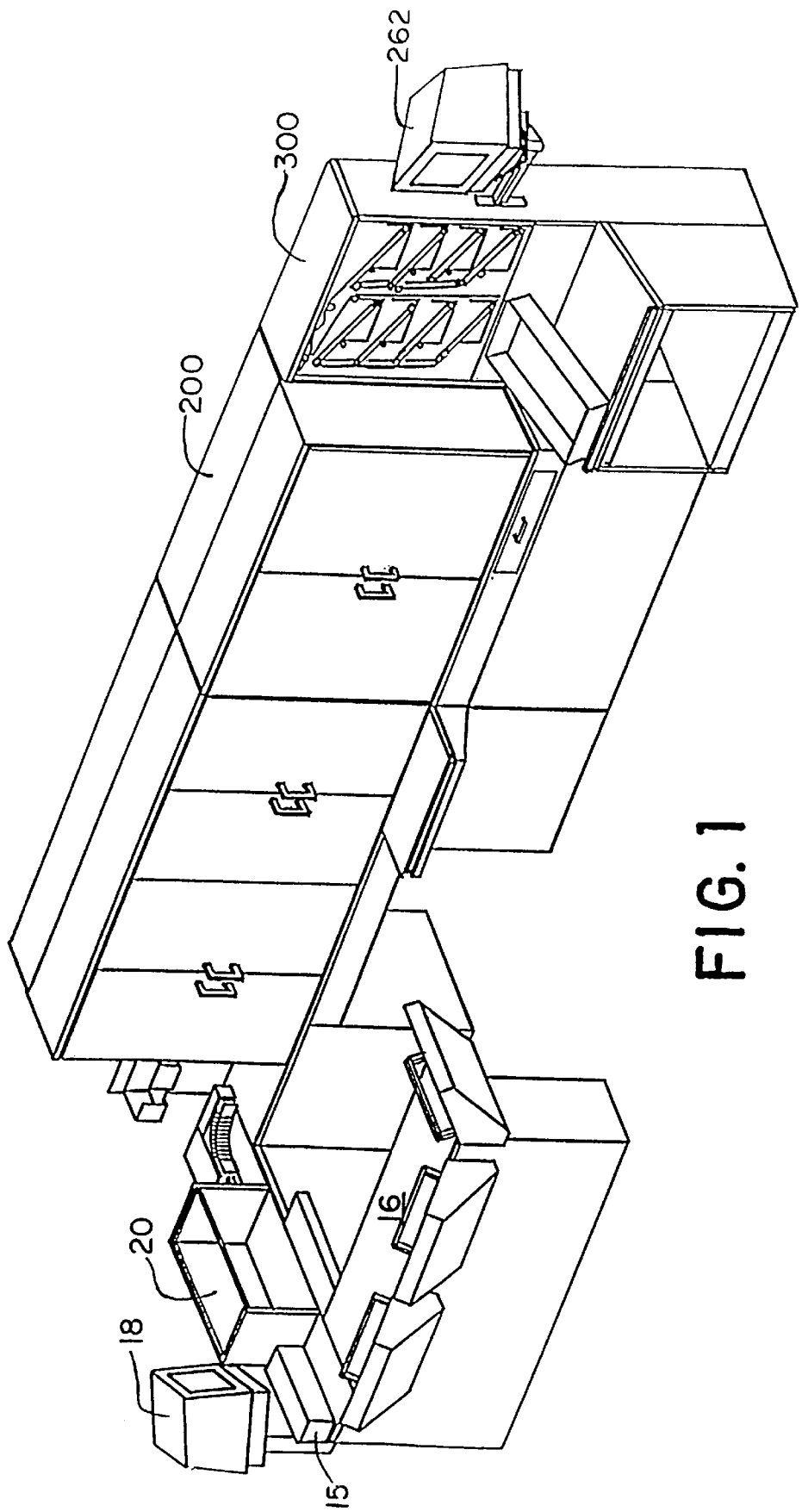
FIG. 1 is a schematic perspective view of an automated document processing apparatus in accordance with the present invention.
Figure 17:
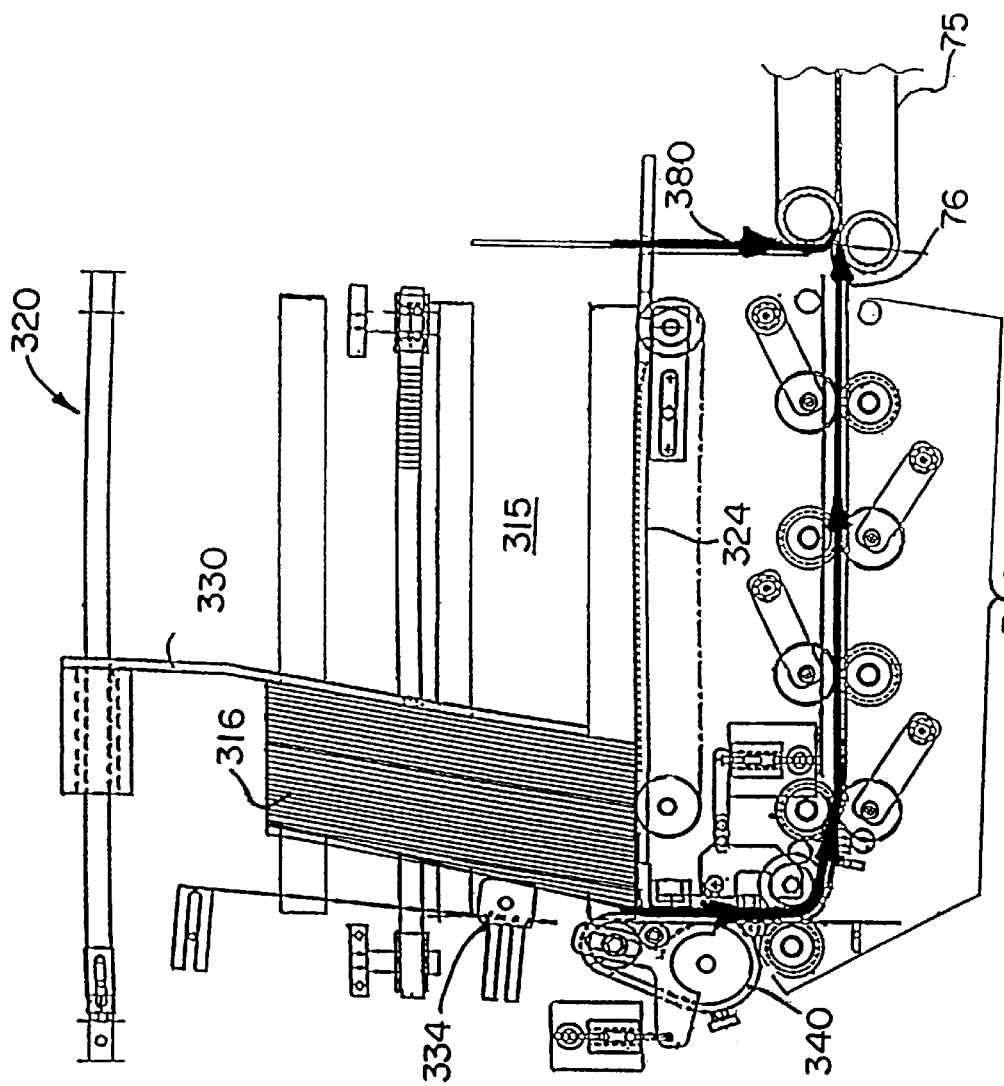
Figure 18:
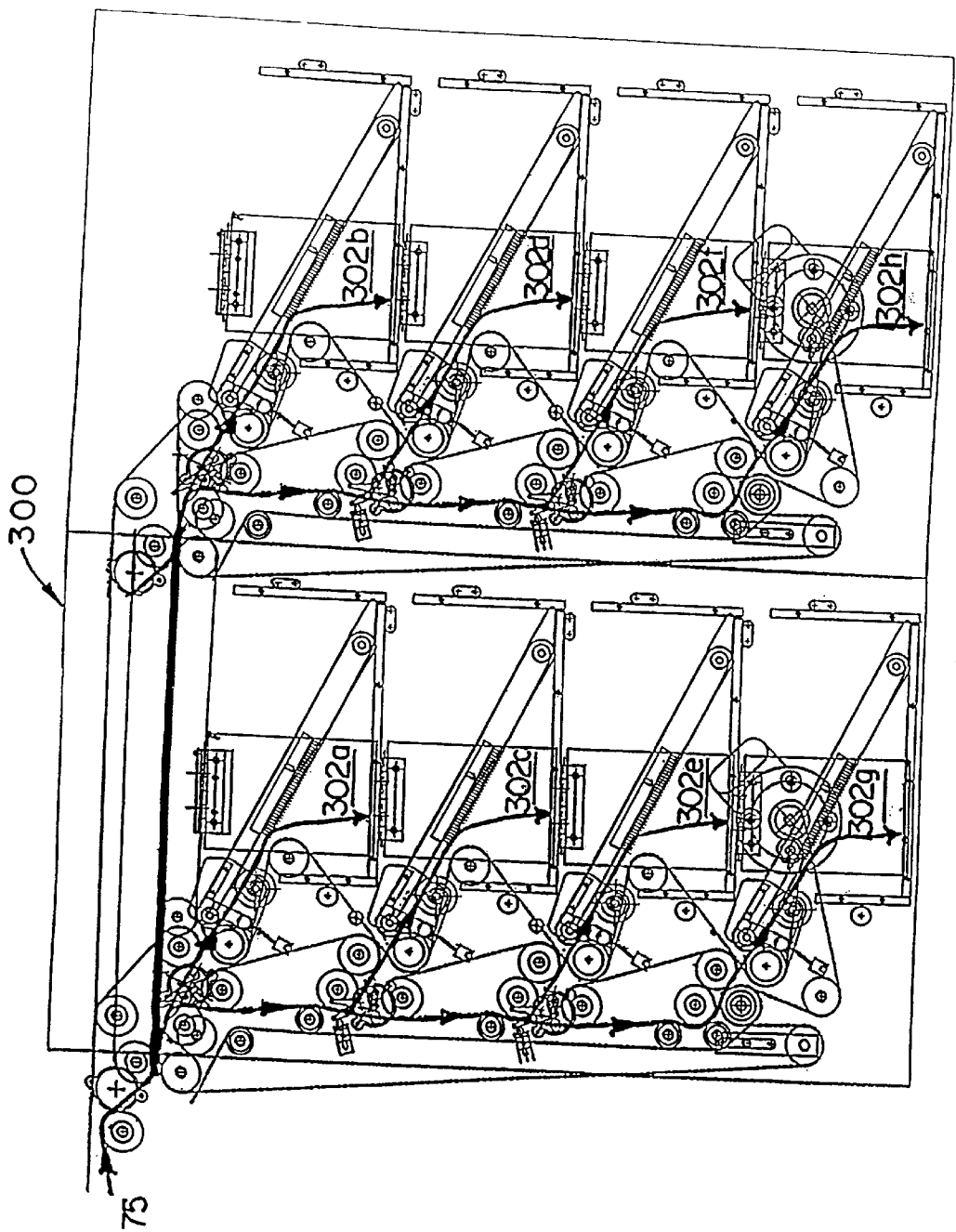

FIG. 17 is an enlarged fragmentary front elevational view of the document feeder of the automated document processing apparatus illustrated in FIG. 1, illustrating the flow of documents through the document feeder; and FIG. 18 is an enlarged fragmentary front elevational view of the stacker of the automated document processing apparatus shown in FIG. 1, illustrating the flow of documents through the stacker.

DETAILED DESCRIPTION OF THE PREFERRED EMBODIMENTS

Referring to the drawings in general and more specifically to FIGS. 1–6 and 14, an apparatus for automatic processing of documents contained within envelopes is illustrated. The apparatus 10 processes documents by extracting the documents from their envelopes, selectively reordering and reorienting the documents, acquiring and exporting image data for selected documents and sorting the documents into bins.

Figure 2:
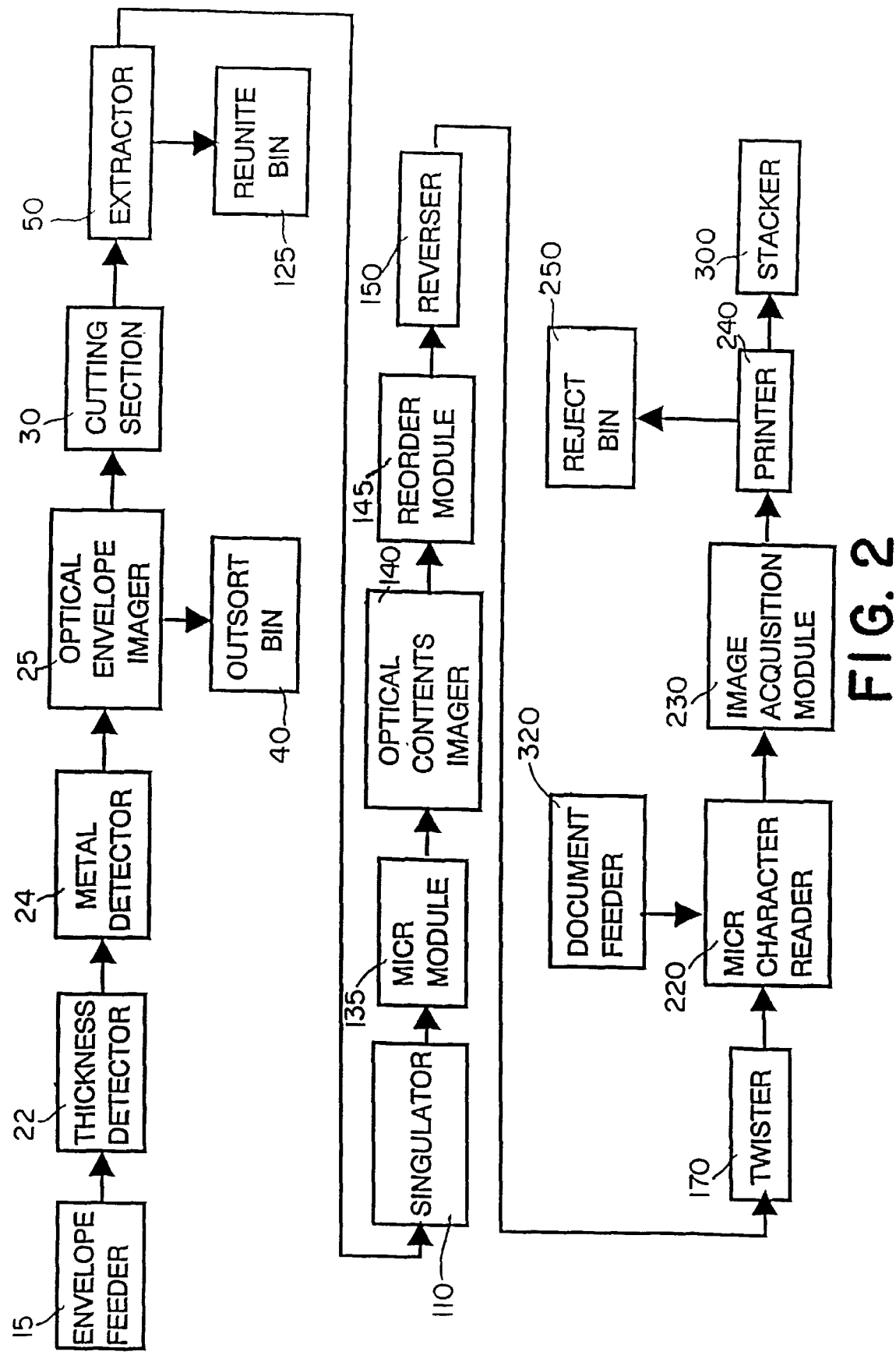
FIG. 2 is a block diagram showing the flow of documents through the automated document processing apparatus shown in FIG. 1.

Referring to FIGS. 1 and 2, a general overview of the flow of documents through the apparatus is provided. Initially, a stack of documents within envelopes is placed into an input bin 16 of a envelope feeder 15. The envelope feeder 15 serially feeds the envelopes into a system transport 75 that conveys the envelopes to an envelope qualifying station 20 that includes a thickness detector 22, a metal detector 24 and an optical envelope imager 25. The envelope qualifying station 20 examines each envelope to determine whether the envelope qualifies for extraction. Envelopes that are qualified for extraction are opened in a cutting area 30 and then conveyed to an extractor 50 to extract the transactional contents from the envelopes. A singulator 110 separates the documents within the transactions and serially feeds the documents into the orientation section 100. In the orientation section 100, the order and orientation of each document are determined. The documents are then selectively manipulated by a reordering module 145, a reverser 150 and a twister 170 so that the documents in each transaction are in a predetermined order and orientation.

After the documents are properly ordered and oriented, the documents are conveyed to an imaging section 200 that magnetically and optically images the documents to acquire image data for each document. The image data is stored in a file for later use during remittance processing. In the imaging section 200, the documents are first magnetically imaged by a MICR character reader 220, which reads the MICR line on the checks. Next, an image acquisition module 230 which includes at least one line scan camera 231, scans the documents to obtain an optical image of each selected document. The apparatus then processes the images to extract information about each document, such as the OCR line that appears on invoices. The extracted information and the image of the document are used to create a document record for each document. The records for a group of transactions, referred to as a batch, are combined to form a batch file.

After the documents are imaged, a printer module 240 prints information on the documents, such as the batch number, the transaction number, the document number, and the date on which the document was processed. From the printer module, the documents are conveyed to a stacker 300, which sorts the documents into a series of bins 302a–302h. The stacker 300 sorts the documents into groups referred to as batches. Each batch is assigned a control number, referred to as a batch number. For each batch, the stacker 300 sorts the invoices into one bin, and the checks into a separate bin. Alternatively, it may be desirable to stack the checks and invoices for a batch together into one bin so that the documents for each particular transaction are together in the same stack.

A system controller 95 monitors the flow of documents in response to signals received from the various components of the apparatus 10. In particular, the system controller 95 monitors the boundaries of each transaction as the documents are processed. Because each envelope defines the boundaries for each transaction, and the documents are initially contained within envelopes, the boundaries for each transaction are known. Once documents are extracted from an envelope, the system controller monitors the documents from each transaction to ensure that documents from one transaction do not become associated with the documents from a different transaction. For example, the system controller ensures that a check from envelope A does not become associated with an invoice from envelope B. This is referred to as maintaining transactional integrity. The system controller 95 ensures that transactional integrity is maintained through the entire process.

Two personal computers allow an operator to interface with the system controller 95. An operations computer is the primary interface with the system controller for controlling the operation of the apparatus. The operations computer includes a monitor 18 to display information regarding the processing of documents. A keyboard is also provided to allow the operator to input various information necessary to process a group of documents, such as the type of transactions to be processed. In addition, an imaging computer 260 operating under the Windows NT operating system allows the operator to interface with the system controller 95 regarding operation of the imaging section of the apparatus.

A display 262 for the imaging computer 260 is mounted on an articulating arm on the side of the stacker 300 and a keyboard for the imaging computer is stored in a drawer below the imaging section.

Qualifying Envelopes for Extraction

Figure 3:
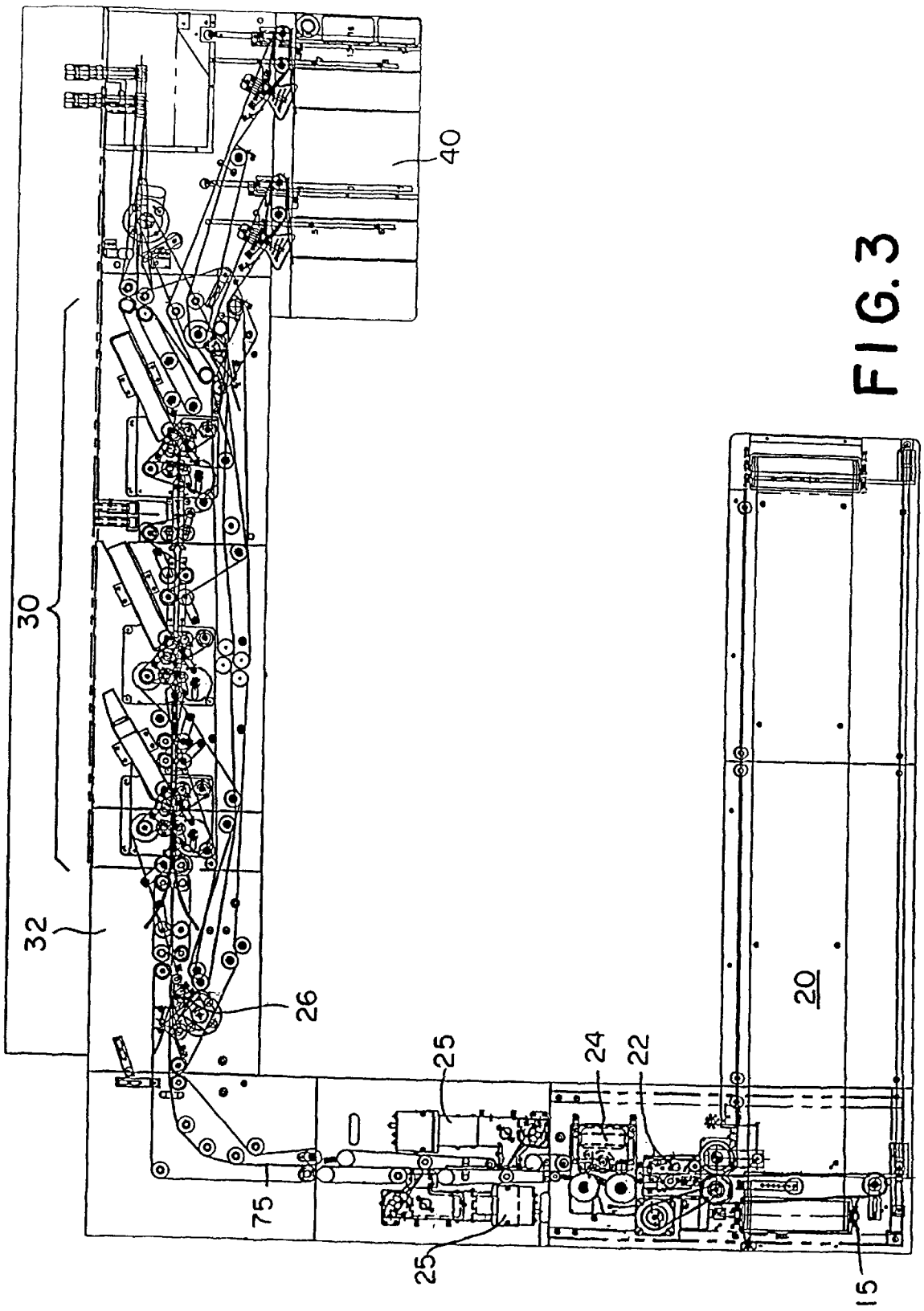
FIG. 3 is a fragmentary plan view of the automated document processing apparatus shown in FIG. 1, illustrating an envelope feeder and a cutting section for opening envelops.
Figure 4:
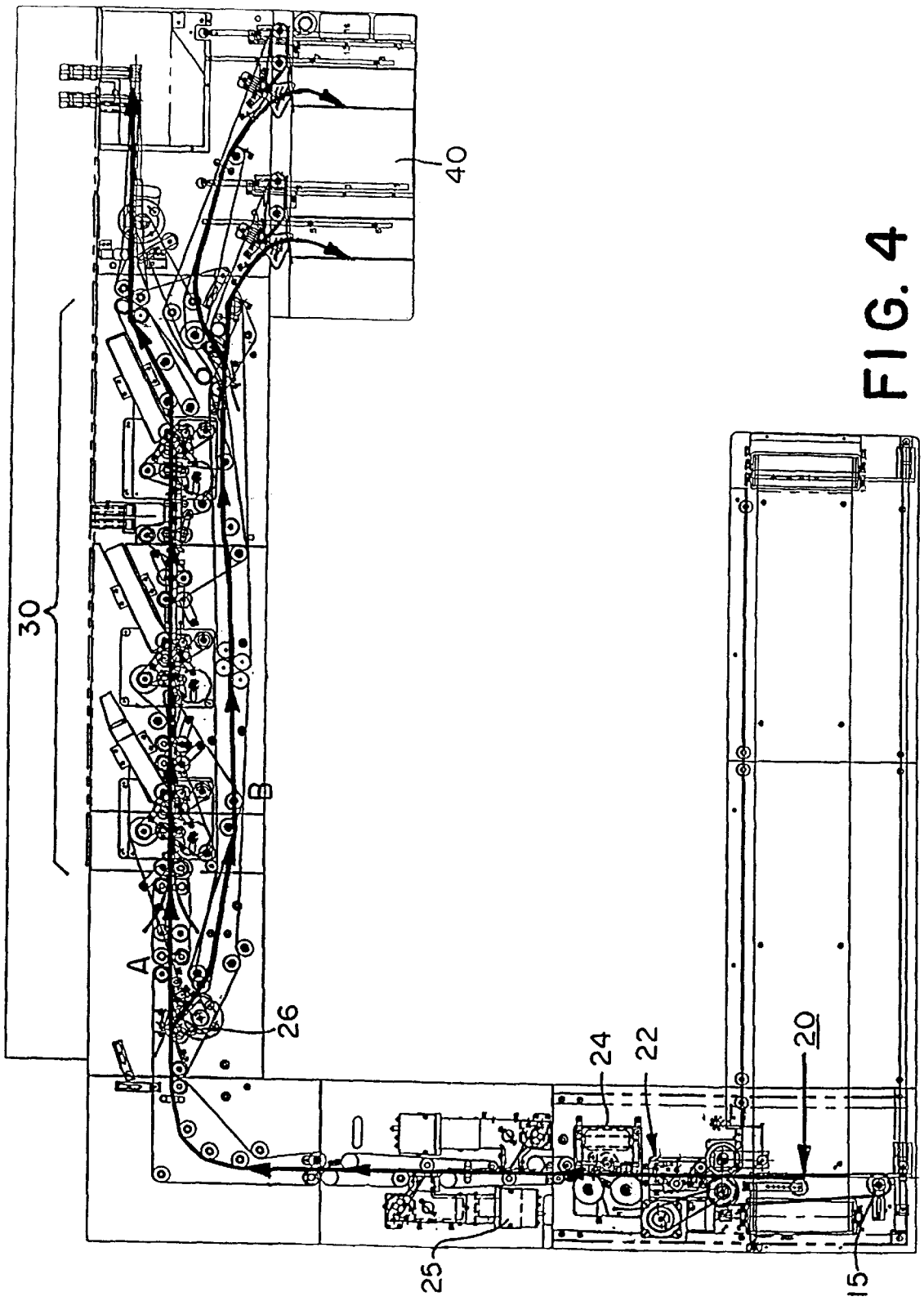
FIG. 4 is a fragmentary plan view of the automated document processing apparatus shown in FIG. 1, illustrating the flow of documents through the envelope feeder and the cutting section.
Figure 5:
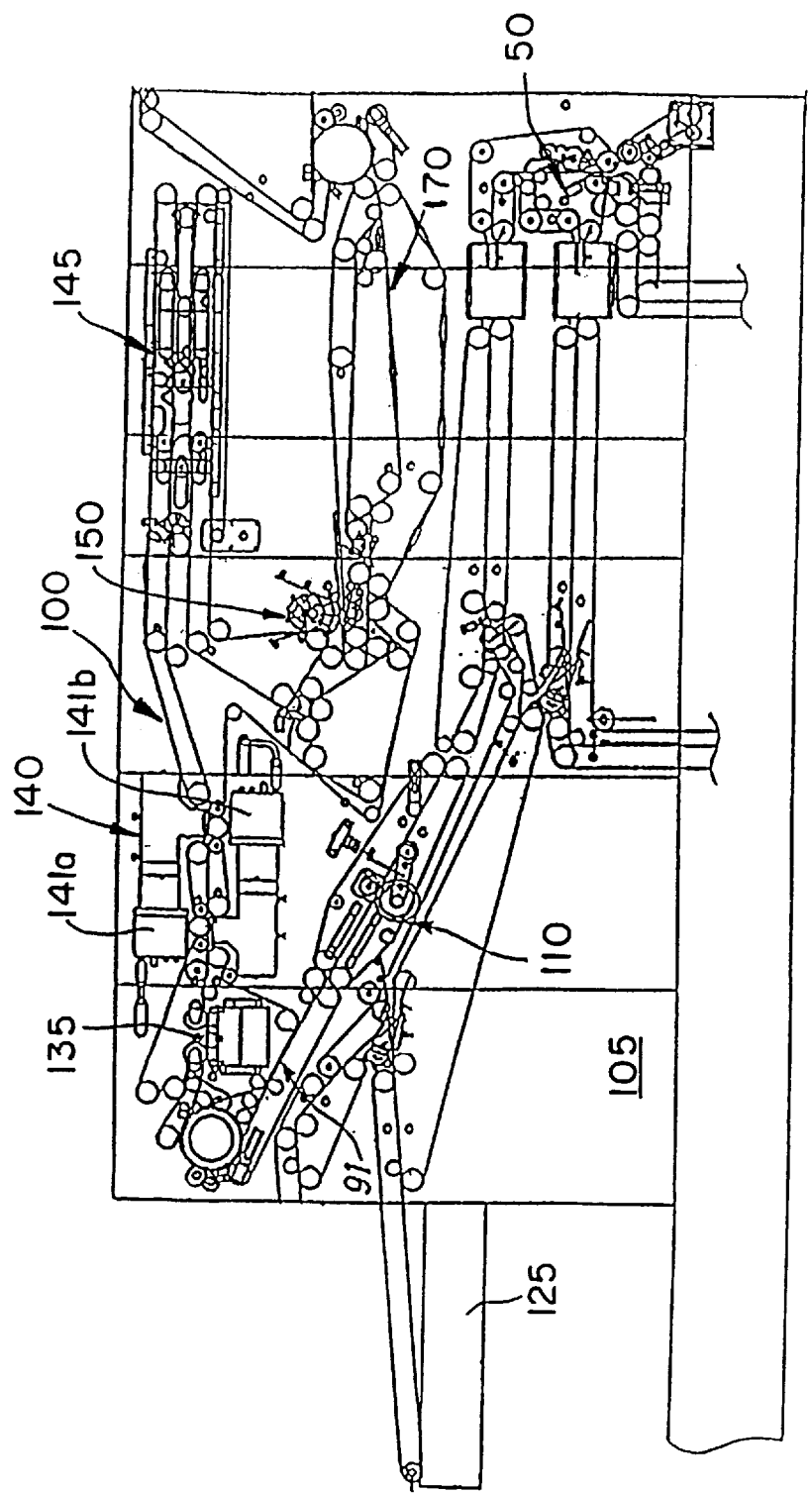
FIG. 5 is a fragmentary side elevational view of the automated document processing apparatus shown in FIG. 1, illustration details of the extractor and the orientation section.
Figure 6:
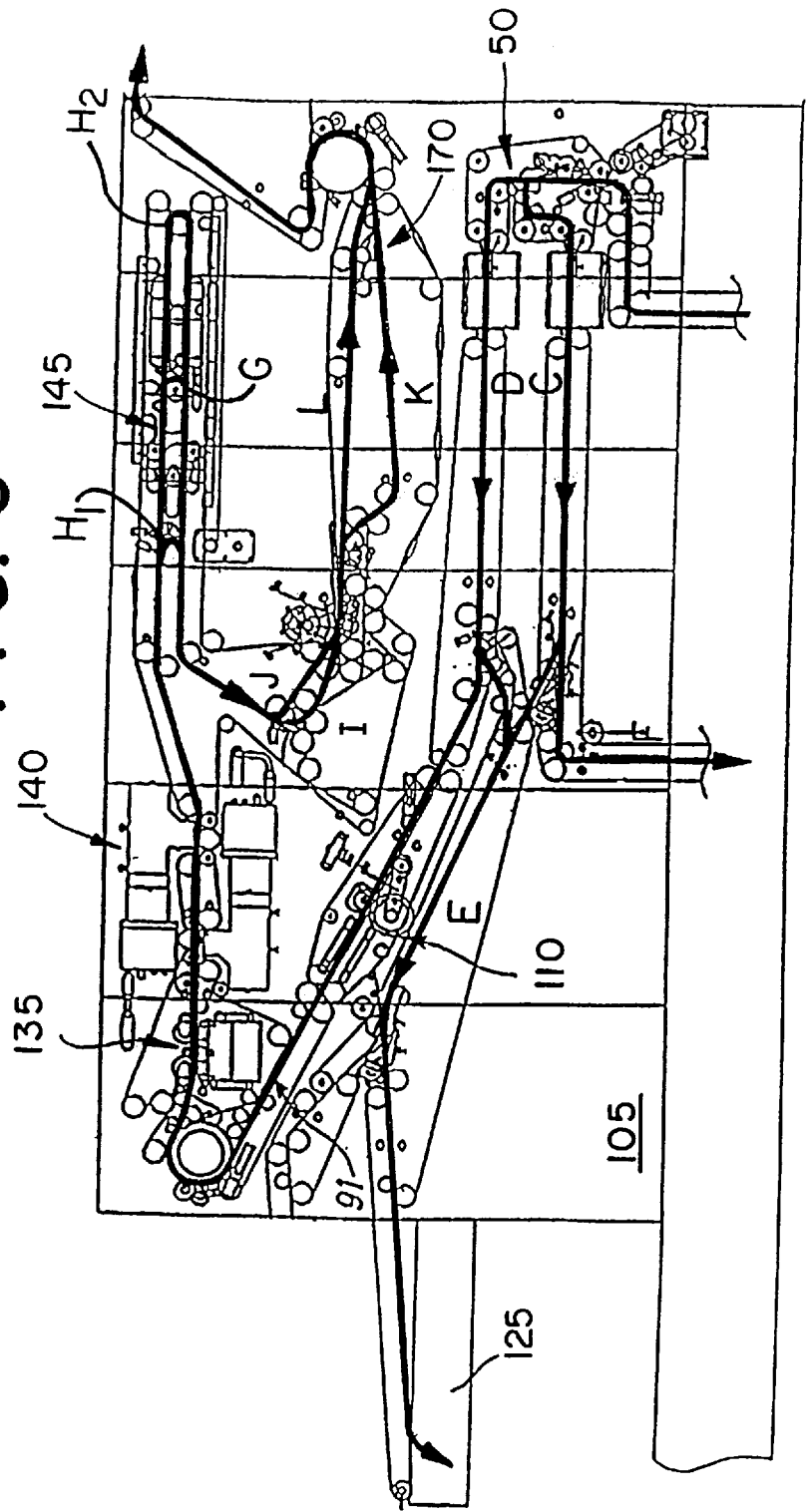
FIG. 6 is a fragmentary side elevational view of the automated document processing apparatus shown in FIG. 1, illustrating the flow of document through the extractor and the orientation section.

Referring now to FIGS. 1, 3 and 4, a stack of envelopes is placed into the input bin 16 of the envelope feeder 15 which serially feeds the envelopes into the system transport 75. The system transport conveys the envelopes to an envelope qualifying station 20 that includes a series of detectors for examining each envelope to determine if the envelope meets certain criteria for being extracted. If an envelope meets the criteria for extraction, the envelope is directed to the cutting area 30 and the extractor 50. Otherwise the envelope is directed to an outsort bin 40.

The first extraction qualifying detector is a thickness detector 22. If the thickness of an envelope does not fall within a predetermined range, the envelope is electronically tagged by the system controller 95 and outsorted prior to extraction. For example, the basic mode of operation for the apparatus 10 is processing singles, which are transactions that consist of only one check and one invoice. Envelopes that contain only one document, such as a check without an invoice, will have a thickness that is less than the allowable range. Such envelopes are not qualified for extraction. In the same way, envelopes that contain more than two documents will have a thickness that is greater than an allowable range, and therefore are not qualified for extraction. Envelopes that do not qualify for extraction are electronically tagged and outsorted prior to extraction so that the outsorted envelopes can be processed separately from the envelopes containing singles. In addition, the thickness indicator 22 does not qualify envelopes containing paper clips or returned credit cards because the envelopes typically have a thickness that is greater than the allowable range. Therefore, envelopes containing returned credit cards or paper clips, which generally require special handling, are outsorted prior to extraction.

The envelopes are next qualified by a metal detector 24. The metal detector detects the presence of ferrous and non-ferrous metallic objects such as staples and paper clips. If the metal detector 24 detects the presence of a metallic object within an envelope, the envelope is not qualified for extraction and the system controller 95 electronically tags the envelopes so that the envelope is outsorted prior to extraction.

An optical envelope imager including at least one line scan camera 25 may also be included to qualify the envelopes prior to extraction. The camera 25 scans a portion of each envelope to determine whether selected information or markings are present. For instance, a customer response box may be located on the back of an envelope. The envelope scanning camera 25 scans the customer response box to determine whether the customer has indicated a response by placing a mark in the response box. In addition to scanning for marks, the envelope scanning camera 25 can be used to determine the presence of particular information on an envelope, such as a change of address indication on the envelope and a POSTNET bar code. The camera 25 can further be used to detect whether an envelope and its contents are damaged. If the envelope and its contents are damaged, or if selected information or a mark is detected, the envelope may be electronically tagged and outsorted prior to extraction. Alternatively, if selected information or a mark is detected and the envelope is not damaged, the envelope and its contents may be processed and the system controller 95 may electronically tag the envelope indicating that selected information was present on the envelope or that a particular mark was present on the envelope. Later, the data regarding the information or mark appearing on the envelope can be combined with data regarding the image of the documents in the envelope, as will be further discussed below. The optical envelope imager may also include a second camera so that both sides of each envelope can be scanned to qualify the envelopes.

From the optical envelope imager, the system transport 75 conveys the documents to a gate 26 that is operable between two positions. Envelopes that were not qualified for extraction because they do not meet certain criteria are directed down an outsort path designated B in FIG. 4 to the outsort bin 40. For example, if the thickness detector 22 detects an envelope that has a thickness that is not within a predetermined range, the system controller does not qualify the envelope for extraction, and the envelope is directed to outsort path B.

Envelopes that are qualified for extraction are directed down the path designated A to the cutting area 30. In the cutting area 30, the leading edge, top edge and bottom edge of each envelope are cut so that the faces of each envelope are only joined along the trailing edge. From the cutting area, each envelope and its accompanying transaction are conveyed to an extractor 50. In the present instance, to minimize the floor space of the apparatus, the extractor 50 and the orientation section 100 are mounted on a vertical base plate 105, perpendicular to the horizontal base plate 32 of the cutting area 30.

Extraction of Contents from Envelopes

Figure 7:
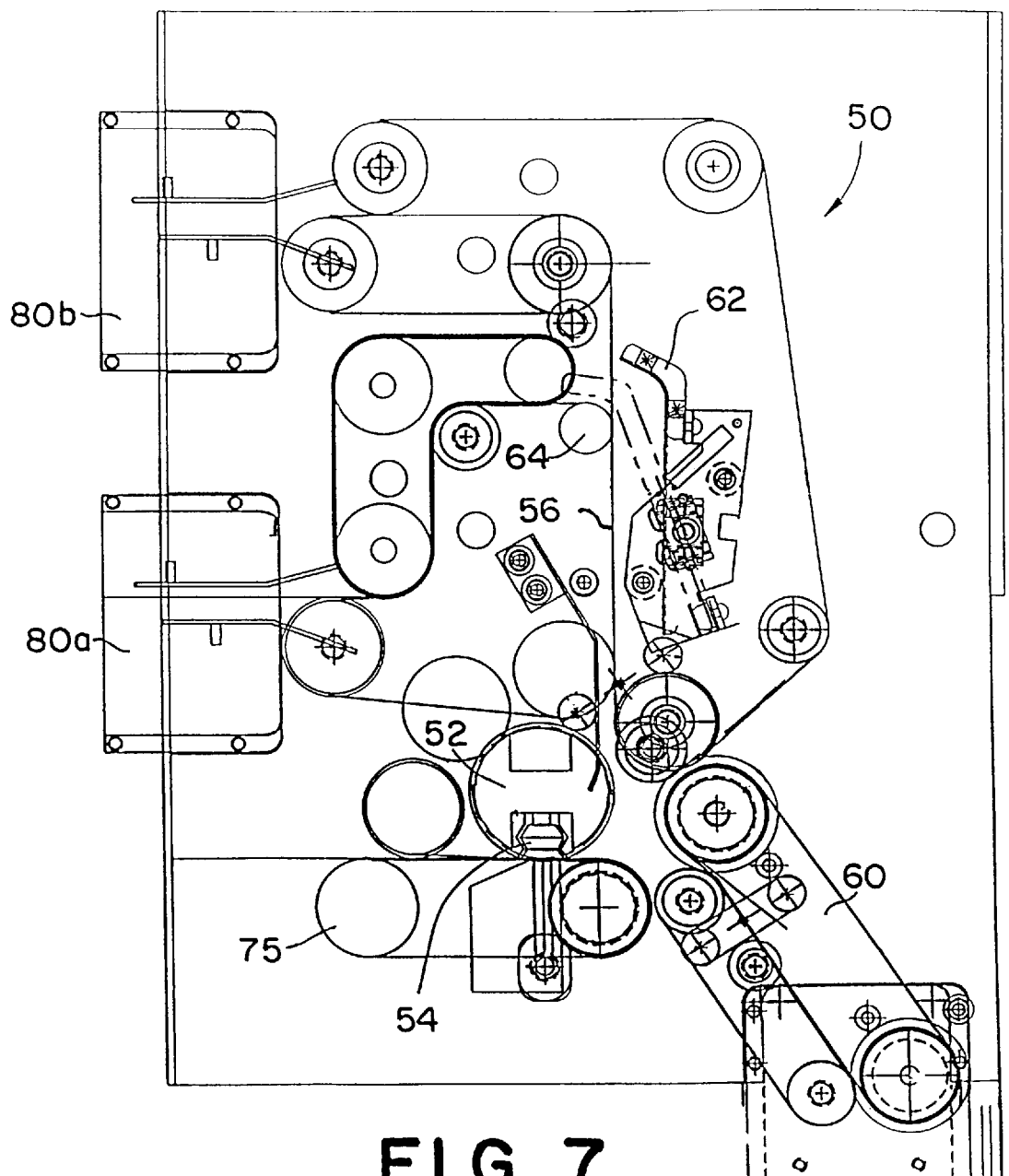
FIG. 7 is an enlarged fragmentary front elevational view of the extractor of the automated document processing apparatus shown in FIG. 1.

Referring now to FIG. 7 the details of the extractor 50 are more clearly illustrated. The extractor 50 separates an envelope from its contents by peeling off one envelope face and then directing the envelope down one path, and the contents down another path. The operation of the extractor 50 is more clearly understood with reference to FIGS. 7A–7E, which illustrate the progress of an envelope and its contents through the extractor.

Figure 7A:
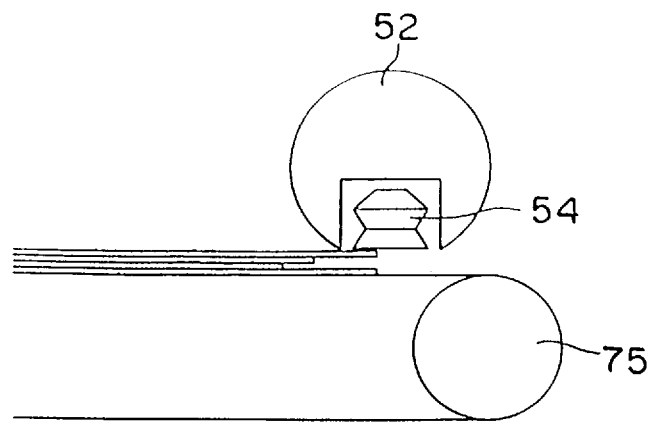
FIG. 7A is an enlarged fragmentary front elevational view of a portion of the extractor shown in FIG. 7, illustrating a piece of mail as it enters the extractor.
Figure 7B:
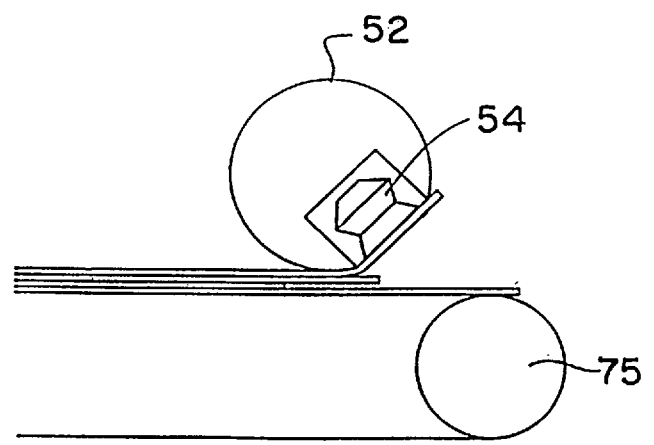
FIG. 7B is an enlarged fragmentary front elevational view of a portion of the extractor shown in FIG. 7, illustrating the initial extraction of documents from an envelope.
Figure 7C:
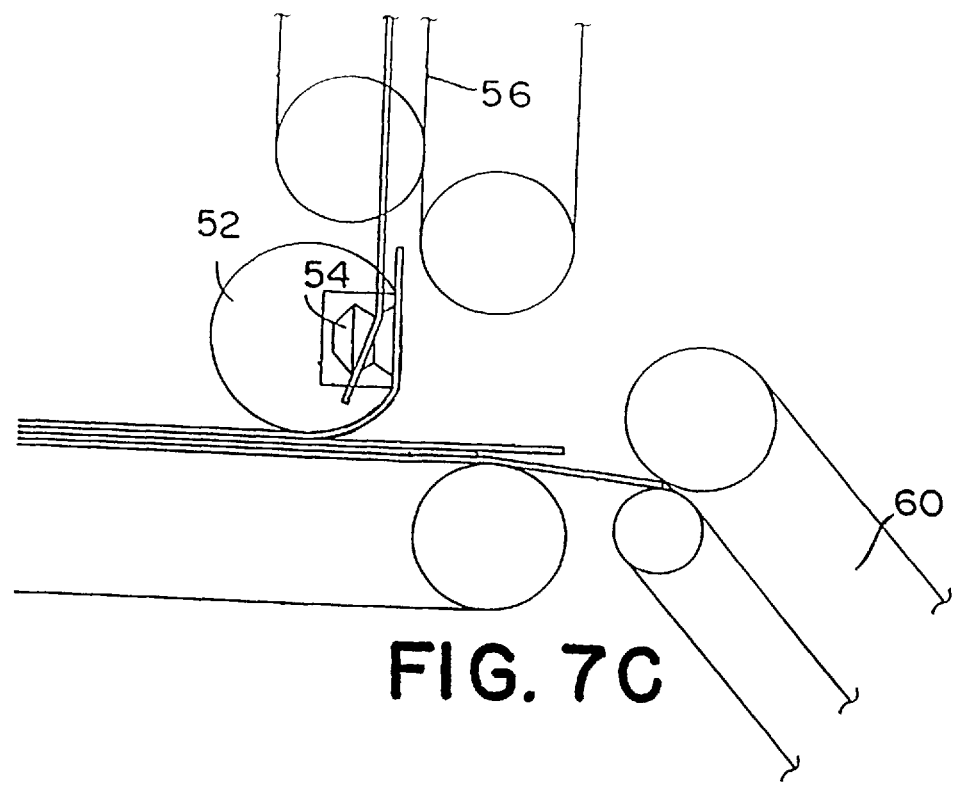
FIG. 7C is an enlarged fragmentary front elevational view of a portion of the extractor shown in FIG. 7, illustrating one face of the envelope entering an extraction transport and one section of the document entering a reversible transport.

In FIG. 7A, an envelope is shown as it first enters the extractor. The system transport 75 conveys the envelope and its contents past a rotatable extraction head 52. A suction cup 54 is mounted in a cavity in the extraction head 52. Referring to FIG. 7B, the suction cup 54 entrains one face of the envelope, referred to as the leading face. As the envelope passes horizontally through the extractor, the extraction head 52 rotates so that the leading face entrained by the suction cup is peeled away from the contents and diverted upwardly into an extraction transport 56, as shown in FIGS. 7B and 7C. At the same time, the contents of the envelope and the trailing face are directed downwardly into a reversible transport 60, which conveys the contents and the trailing face away from the leading face.

Figure 7D:
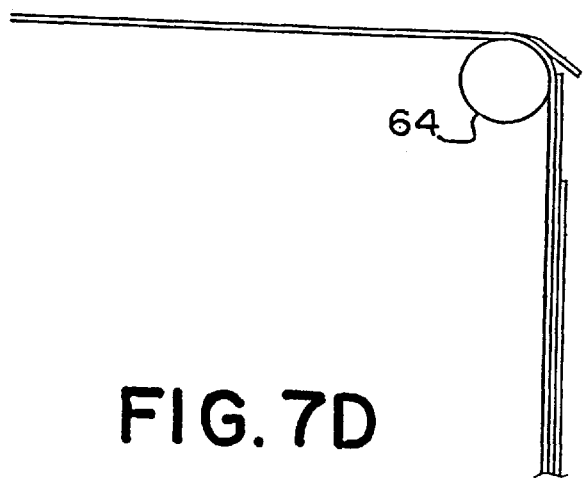
FIG. 7D is an enlarged fragmentary front elevational view of a portion of the extractor shown in FIG. 7, illustrating an envelope passing about a small diameter roller.
Figure 7E:
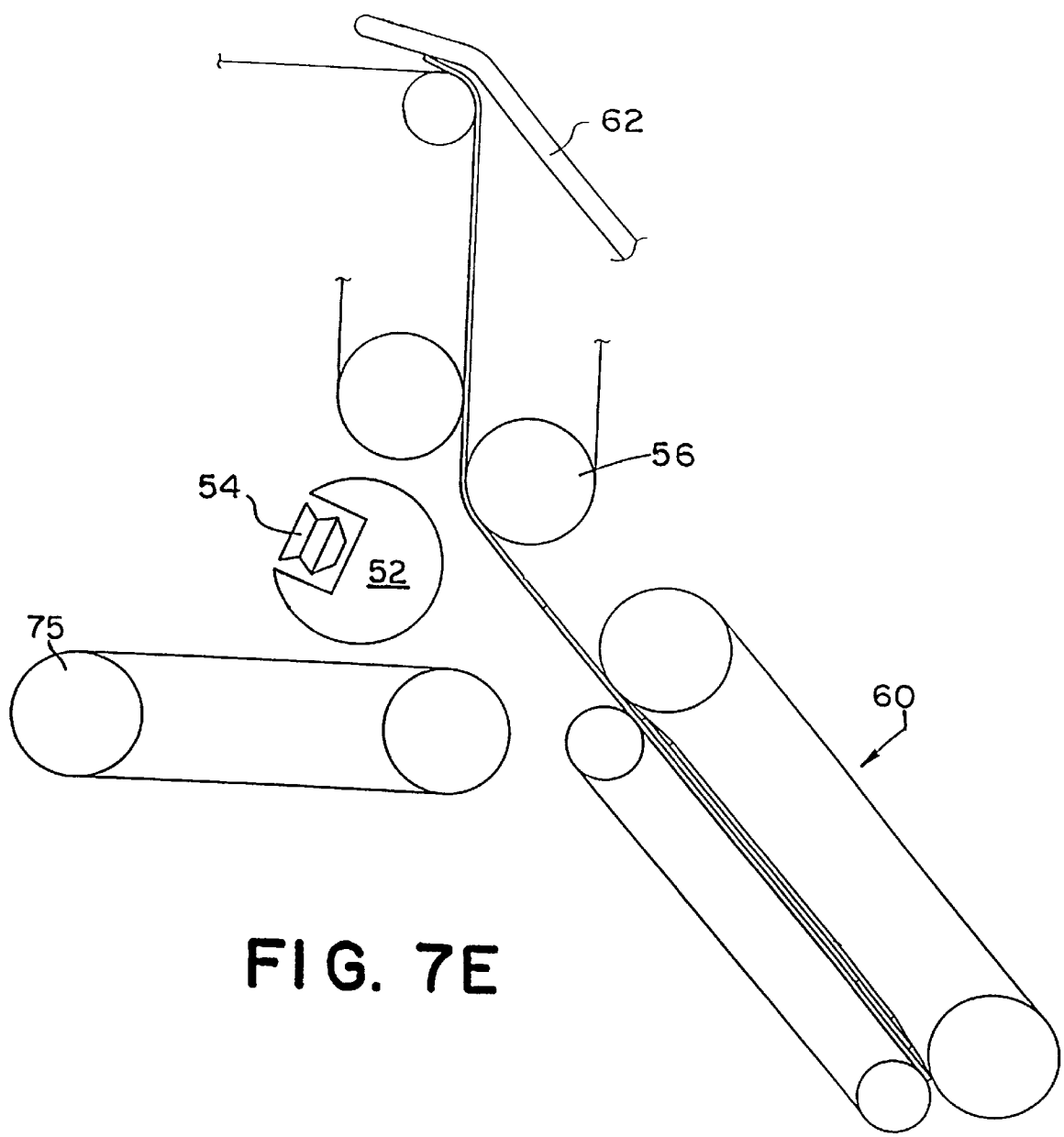
FIG. 7E is an enlarged fragmentary front elevational view of a portion of the extractor shown in FIG. 7, illustrating a deflector directing the leading face of an envelope down an envelope path.

As shown in FIG. 7E, the faces of the envelope are conveyed away from one another until the faces are stretched end to end to form a single taut length of paper joined in the middle by what was previously the trailing edge of the envelope. The reversible transport 60 then reverses directions and conveys the contents and the trailing face upwardly into the extractor transport 56.

A pivotable deflector 62 along the extraction transport 56 directs the leading face toward an envelope path, which is designated C in FIG. 7. After the leading envelope face enters the envelope path designated C, the deflector 62 pivots away from the extraction transport 56. The trailing face follows the leading face down envelope path C because the faces are connected. However, because the deflector 62 has been pivoted away from the extraction transport 56, the contents of the envelope follow the main path of the extraction transport to a document path designated D in FIG. 7. In this way, the envelope is separated from its contents.

Frequently, one of the documents in an envelope is entrained by one of the flaps that form the envelope, preventing separation of the envelope from the contents. To improve the separation between the envelope and its contents, the envelope passes around a small diameter roller as the envelope enters envelope path C. As shown in FIG. 7D, by passing the envelope faces about a roller of relatively small diameter, the flaps associated with the envelope faces are peeled away from the envelope face, thereby releasing any potentially entrapped documents from between the flap and the envelope face.

A pair of thickness detectors 80a and 80b are disposed along the envelope path C and the document path D. The envelope thickness detector 80a senses the thickness of the envelope as the envelope leaves the extractor 50, and compares the thickness of the envelope with a predetermined limit. If the thickness of the envelope exceeds a predetermined limit, the system controller electronically tags the envelope so that the envelope and its contents are reunited and directed along the path designated E to a reunite bin 125. Similarly, if the document thickness indicator 80b indicates a thickness that exceeds a threshold level, it is assumed that the contents were not properly extracted from their respective envelope. The system controller 95 therefore electronically tags the content so that the contents are reunited with their respective envelope and directed along the path designated E to a reunite bin 125. If the thickness detectors 80a, 80b indicate that the contents have been properly extracted from their envelope, the envelope is directed along the path designated F to a waste container and the contents are directed along the path designated G to a singulator 110 that separates the documents within the transaction.

Figure 8:
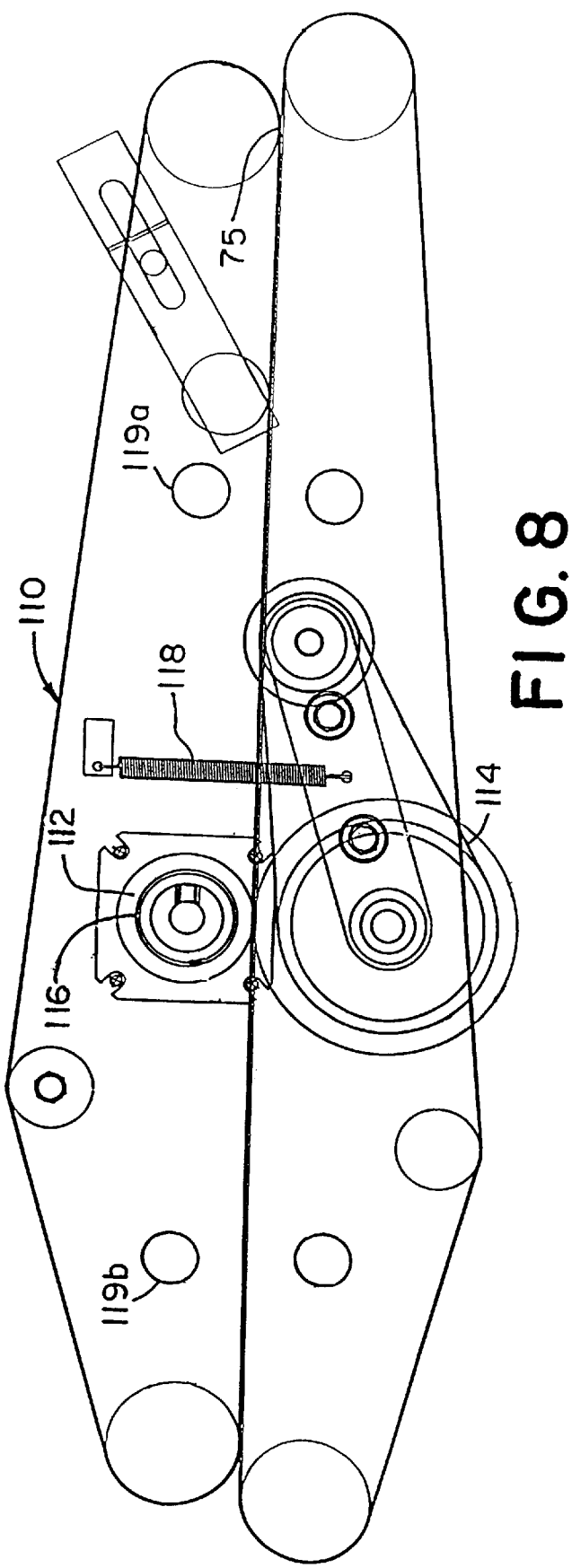
FIG. 8 is an enlarged front elevational view of the singulator of the automated document processing apparatus shown in FIG. 1.

Referring now to FIG. 8, the singulator 110 receives the transactional pairs of documents that were extracted by the extractor 50 and separates the documents so that the documents are serially delivered to the orientation section. The singulator includes an idler roller 112 and an opposing drive roller 114 mounted on a pivotable arm. A spring 118 connected to the arm biases the drive roller 114 toward the idler roller 112. The outer surface of the idler roller 112 has a coefficient of friction that is greater than the coefficient of friction of the outer surface of the drive roller 114. In addition, the coefficient of friction of the outer surface of the drive roller is greater than the coefficient of friction between the faces of the pair documents in a transaction. A brake 116 is also provided to stop the rotation of the idler pulley 112. An entry sensor 199a and an exit sensor 119b, tracks the documents as the documents pass through the singulator 110.

During operation, the system transport 75 conveys a transactional pair of documents in face-to-face arrangement to the singulator 110. The entry sensor 119a senses the leading edge of the pairs of documents as the pair enters the singulator 110, and then after a predefined delay, the brake 116 engages the idler roller 112 to retard or stop the rotation of the idler roller. The pair of documents then enters the nip formed between the idler roller 112 and the drive roller 114. Because the outer surface of the idler roller has a coefficient of friction that is higher than the coefficient of friction of both the drive roller and the faces of the pair of documents, braking the idler roller causes the idler roller to engage and retard the progress of the document confronting the idler roller. At the same time, the document confronting the drive roller 114 is driven past the exit sensor 119b by the drive roller. In this way, the document that was initially confronting the drive roller becomes the leading document of the transactional pair.

Once the exit sensor 119b detects the passage of the leading edge of the leading document, the brake 116 disengages the idler roller 112, after a predetermined delay so that the drive roller 114 drives the trailing document past the exit sensor 119b. The release of the brake is controlled by the system controller in response to signals received from the exit sensor 119b, and is timed to control the gap between the leading and trailing documents in a transaction.

From the singulator 110, the apparatus 10 processes the documents by determining the order and orientation of the documents as the documents are conveyed through the system transport 75. When processing documents in transactions that were extracted from windowed envelopes, the order and orientation of the invoice is known because the customer placed the invoice in the front of the envelope with the preprinted return address visible through the window. Therefore, the sequence of the documents in a transactional pair and the orientation of the invoice in the transaction are both considered constant when processing windowed mail. However, the orientation of the check in a transaction is not constant, and therefore must be determined so that the check can be reoriented if necessary.

For this purpose, the system transport 75 serially conveys the documents to a MICR module 135 that functions as a magnetic imager to determine the orientation of the checks. The MICR module 135 first imparts a magnetic charge to the magnetic ink on the checks. The orientation of each check is then detected by reading the flux variation of the characters or markings on the check as the check is conveyed past the MICR module 135. The magnetic readings for the checks are interpreted by the MICR module 135 to determine the orientation of each check. The orientation decision by the MICR Module 135 is then transmitted to the system controller 95 which electronically tags the respective document with the orientation decision data.

The MICR module also verifies that the documents in a transaction are in the proper sequence. If the MICR module detects certain magnetic fluctuations in the document after the document has been magnetized, then the MICR module tags the document as a check. Otherwise, the document is tagged as an invoice or as being an indeterminable document. The information regarding the document identification is communicated to the system controller 95. The system controller 95 then electronically tags each document in sequential order as being a check or an invoice based on the data from the MICR module 135. The MICR module 135 then uses the identification of each document to determine if the documents in a transaction are in the proper order. For example, a desired sequence for a transactional pair of a check and an invoice may be invoice first, then check referred to as invoice/check. If the MICR module 135 detects magnetic markings on the first document, then the first document is presumed to be a check and the documents in the transaction are out of order, i.e. check/invoice order rather than invoice/check. The documents in the misordered transaction are electronically tagged by the system controller and directed to a reject bin 250 in the imaging section 200.

Figure 10:
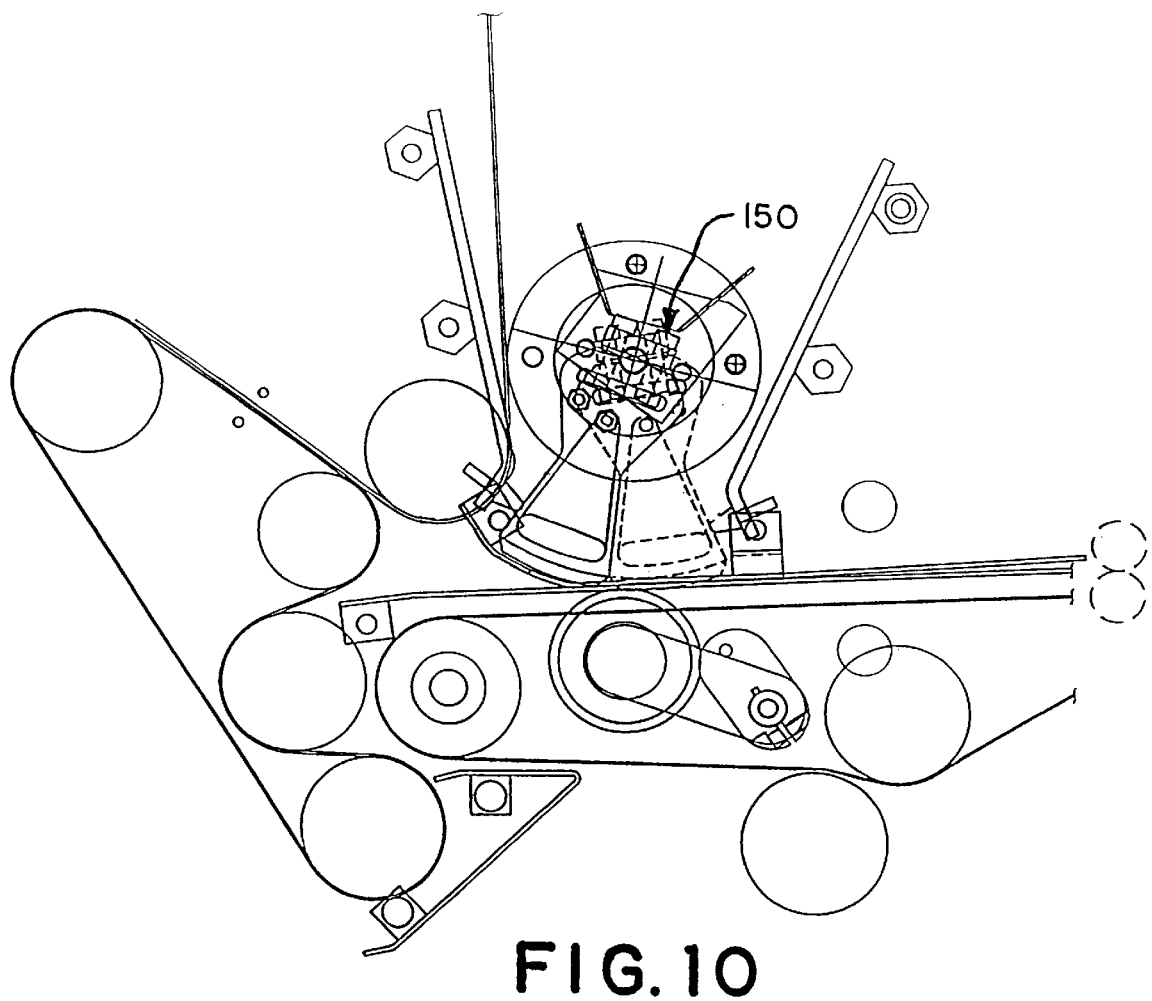
FIG. 10 is an enlarged front elevational view of the reverser of the automated document processing apparatus shown in FIG. 1.

If the MICR module 135 verifies that the documents in a transaction are in order, but the check is not in the proper orientation, the apparatus reorients the check into the proper orientation. For this purpose, the documents are conveyed to a reverser 150, which is illustrated more clearly in FIG. 10. The reverser 150 functions to reorient the checks, if necessary, by flipping the checks from end to end along the path of movement so that the leading edge becomes the trailing edge and the trailing edge becomes the leading edge. As a result, a selected check may be flipped, if necessary, from front to back along the path of movement.

From the reverser 150, the documents are conveyed to a twister 170. If a check is not properly oriented in a right-side-up orientation, the check is reoriented by the twister. The twister 170 reorients a check by flipping the check about a horizontal axis so that the top edge of the check becomes the bottom edge and the bottom edge becomes the top edge. More specifically, the check is transported between belts that twist 180 degrees along the run of the belts. In this way, the check is inverted from an upside-down orientation into a right-side-up orientation. At the same time, because the check is rotated by the twister, the check is also flipped from front to back.

The apparatus can also be used to process documents extracted from windowless envelopes. When documents are extracted form windowless envelopes, the order and orientation of the documents are unknown. As with windowed mail, the MICR module 135 can be used to determine the orientation of the checks and the order of the documents within a transaction. If the MICR module 135 detects certain magnetic fluctuations in the document after the document has been magnetized, then the MICR module tags the document as a check. Otherwise, the document is tagged as an invoice or as being an indeterminable document.

In addition, when processing windowless mail, a second orientation detector is included for determining the orientation of the invoices. For this purpose, the apparatus 10 includes a content imaging module 140 having a pair of line scan cameras 141*a*, 141*b* located along the document path downstream from the MICR module 135. The content imaging module 140 cooperates with the system controller 95 to detect the orientation of the invoices based on the image scanned by the cameras 141*a*, 141*b*. A pair of cameras is provided so that both sides of the invoice can be scanned. The cameras may also be used to scan both sides of each check.

Figure 9:
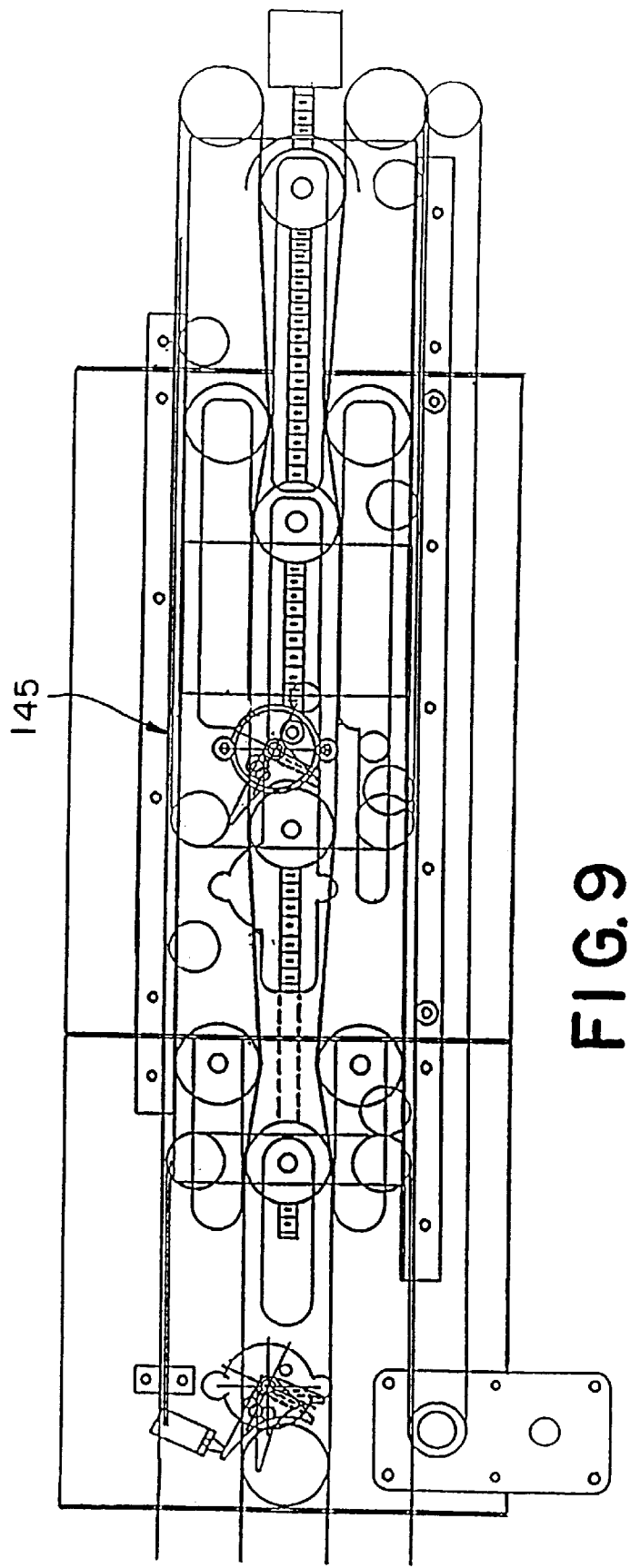
FIG. 9 is an enlarged front elevational view of the reordering module of the automated document processing apparatus shown in FIG. 1.

When processing windowless mail, because the order of the documents within a transaction is not generally constant, it may be desirable to reorder documents within a transaction that are out of sequence, rather than directing the transaction to a reject bin. For this purpose, when processing windowless mail, it is desirable to include a reordering module 145 along the document path prior to the reverser 150. Referring now to FIG. 9, the reordering module 145 functions to reorder the sequence of two successive documents if the two documents are determined to be in the wrong sequence. For instance, if a corresponding check and invoice are being conveyed so that the check precedes the invoice, in a transaction in which the invoice should precede the check, the reordering module 145 switches the sequence of the check and invoice so that the invoice precedes the check along the path of movement.

If the order of the documents within a transaction is not determined, then the documents in the transaction are electronically tagged by the system controller 95 and processed separately from ordered documents in the imaging section, as is detailed below. Similarly, if the orientation of a document is not determined, then the document along with the other documents in the transaction are electronically tagged by the system controller 95 and processed separately from ordered documents in the imaging section.

Imaging Section

Figure 14:
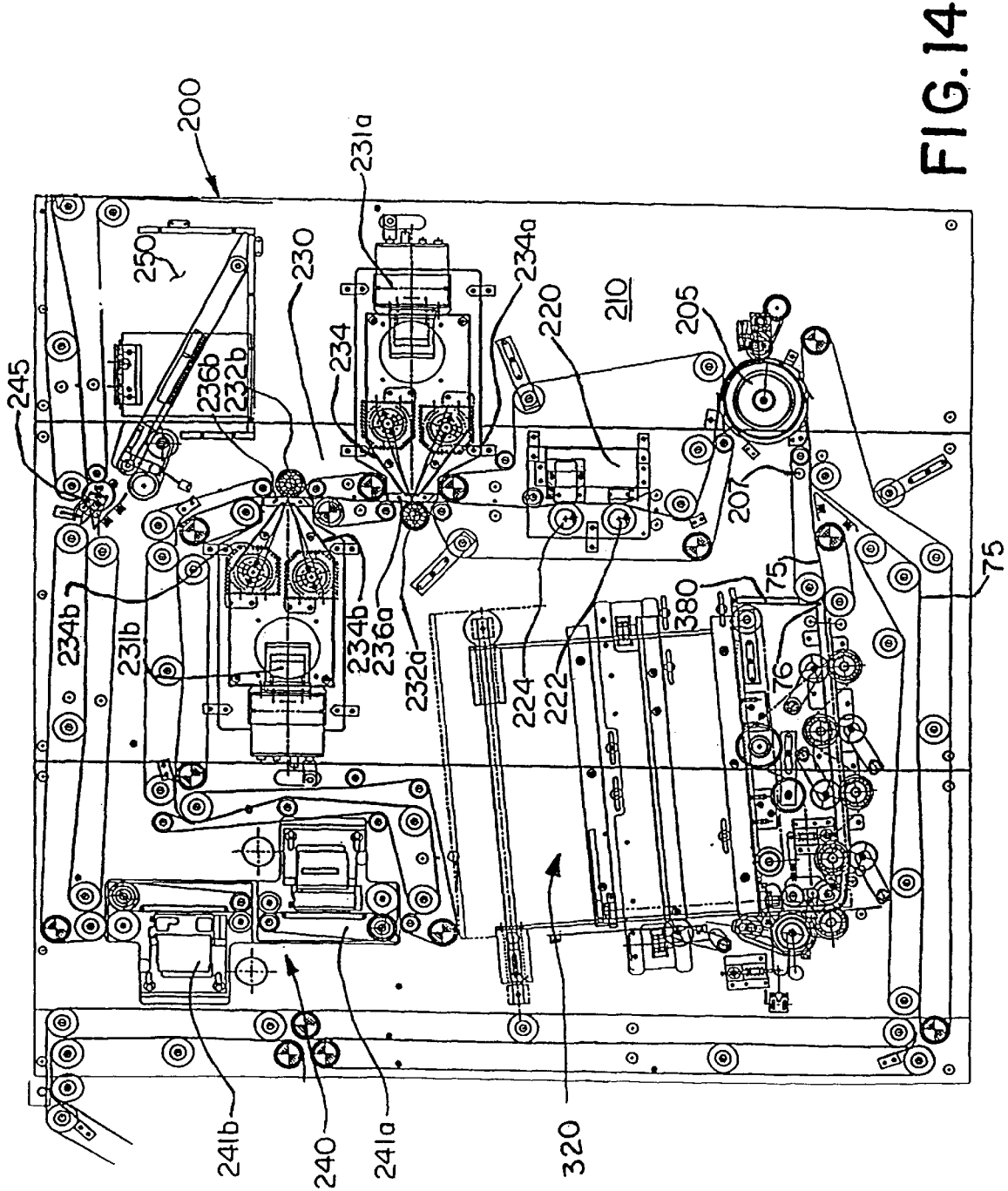
FIG. 14 is an enlarged fragmentary front elevational view of the imaging section of the automated document processing apparatus illustrated in FIG. 1.

After the documents are properly ordered and oriented, the system transport 75 conveys the documents to an imaging section. Referring now to FIG. 14, in the imaging section, the documents are magnetically and optically scanned to extract relevant information about each document to be used later during remittance processing. The documents are first magnetically imaged by a MICR character reader 220, which reads the characters of the MICR line on checks. The documents are then optically imaged by an image acquisition module 230, which includes at least one high resolution line scan camera 231*a*. An imaging computer 260 controls the acquisition of the data in the imaging section and communicates the data with the system controller 95.

Figure 11:
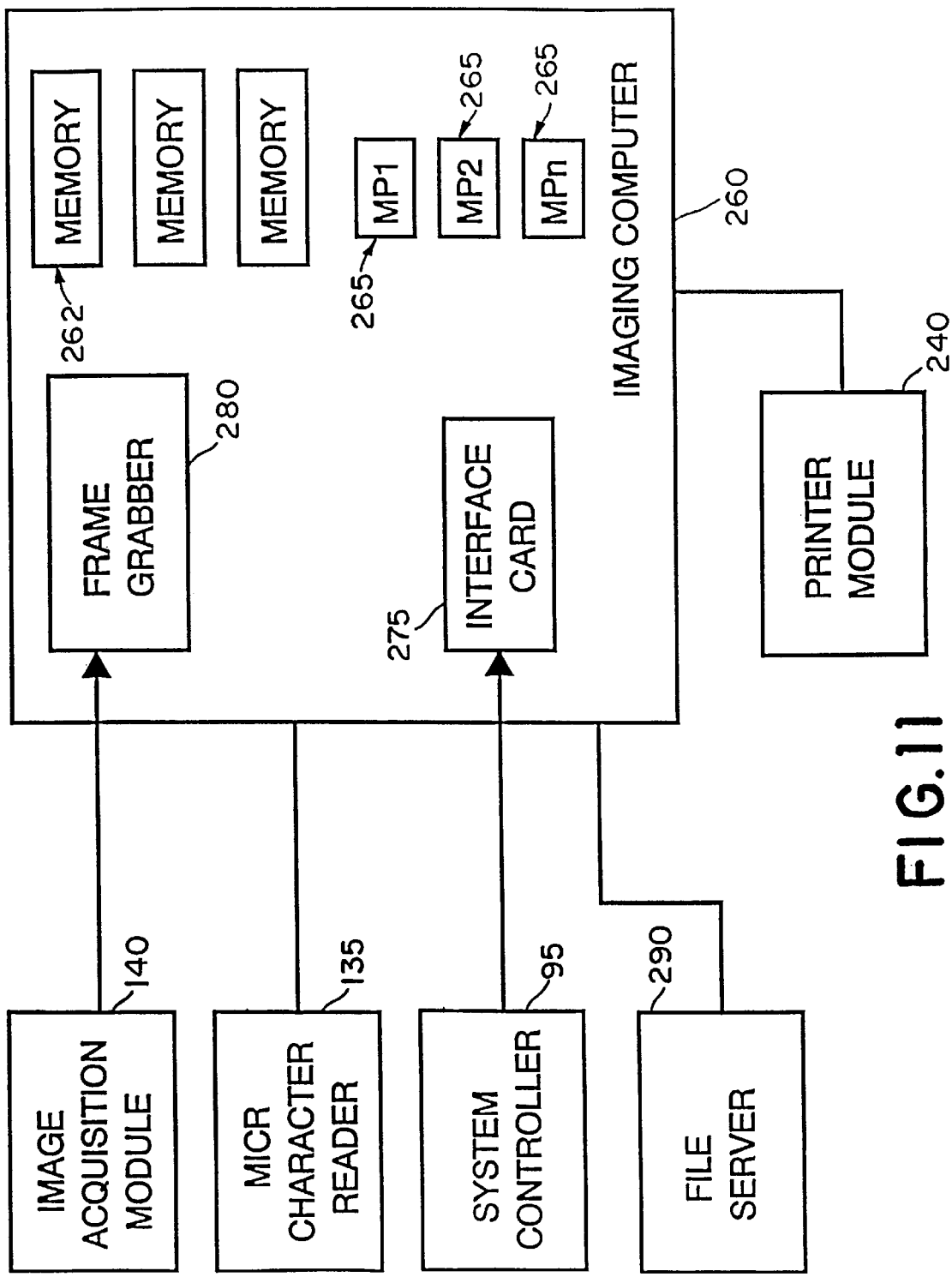
FIG. 11 is a schematic block diagram illustrating the interconnection between the imaging computer and other components of the automated document processing apparatus shown in FIG. 1.

As illustrated in FIG. 11, the imaging computer 260 has at least one microprocessor MP1, however, it may be desirable to include a plurality of microprocessors MP2 through MPn for parallel processing of the data obtained in the imaging section. The imaging computer includes an interface card 275 to provide an interface between the system controller 95 and the imaging computer 260. The system controller 95 is then connected to the interface card of the imaging computer via a high speed serial channel. The imaging computer also includes an image acquisition card or frame grabber 280 providing an interface between the imaging computer and the image acquisition module 230.

Referring again to FIG. 14, before being imaged, the documents are first conveyed to a justifier 205 that justifies an edge of each of the documents relative to the base plate 210 of the imaging section so that each document is maintained in proper position for reading the MICR line on the checks and for imaging the documents. From the justifier 205, the system transport 75 conveys the documents to the MICR character reader 220. The MICR character reader 220 includes a magnet 222 for magnetizing the magnetic ink markings on the checks and a magnetic character read head 224 for reading the characters of the magnetized markings. To scan the MICR line, the documents are first conveyed past the magnet 222 which imparts a magnetic charge to the magnetic ink on the checks. The documents are then conveyed past the magnetic character read head 224 which detects the variations in magnetic flux as the magnetized markings of the checks are conveyed past the read head. After reading the variations in magnetic flux, the MICR character reader 220 determines the characters that make up the MICR line of each magnetized check. The MICR module 220 then communicates the data representing the MICR line to the imaging computer 260.

From the MICR character reader 220, the documents are conveyed to the image acquisition module 230. Along the document path between the MICR module 220 and the image acquisition module 230 an image entry sensor 228 detects the presence of a document. The image entry sensor is an infrared sensor employing an infrared emitter on one side of the document path and an opposing infrared receiver on the other side of the document path. The image entry sensor 228 senses the existence of a document, including a leading and/or trailing edge of a document, within the document path at the location of the sensor.

As shown in FIG. 14 the image acquisition module 230 includes at least one high resolution line scan camera 231*a*. The camera 231*a* is directed toward a plate 236*a* that is located along the document path. The plate has an aperture so that the documents conveyed past the plate are revealed to the camera 231*a*. A roller 232*a* having a resilient outer surface, such as foam rubber, confronts the plate forming a nip for receiving the documents being transported through the imaging section. Because the outer surface of the roller 232*a* is resilient, the roller urges the documents flush against the plate to ensure that the documents are a fixed distance from the camera, for proper focusing, as the documents pass the aperture in the plate. A pair of lights 234*a* straddling the aperture in the plate 236*a* illuminate the surface of the documents as the documents pass by the aperture. Each light comprises a plurality of fiber optic strands oriented in a single plane to provide a focused linear beam of light along the aperture.

The imaging camera 231*a* is mounted in position on the base plate 210 to scan the image of the front face of each document conveyed along the document path. Additionally, the image acquisition module 230 may include a second camera 231*b* similar to camera 231*a*, but mounted in position on the base plate 210 to scan the image of the back face of each document conveyed along the document path. If a second camera is included, a second plate 236*b*, a second resilient roller 232*b* and a second pair of lights 234*b* that are similar to the plate, roller and lights accompanying the first camera, are also included. Additionally, the second camera 231*b*, interfaces with and is controlled by the imaging computer 260 in the same manner as the first camera 231*a*. In this way, the second camera allows the apparatus to capture images such as customer responses that appear on the back of an invoice.

The imaging cameras 231*a*, 231*b* are high resolution line scan cameras suitable to achieve a 200×200 dpi image resolution. The transport moves at approximately 150 inches per second, and the acquisition rate of each camera is matched to the transport speed so that a 200×200 dpi image resolution is achieved. The imaging cameras scan the documents and acquire data representing the light intensity at discrete points of each document. For each point, or pixel, the light intensity is represented by a gray scale number ranging from zero for black to 255 for white. The light intensity for each pixel is communicated to the computer as an eight bit representation corresponding to the gray scale number.

It may be desirable to configure the cameras in the optical contents imager 140 to acquire image data for the documents in the image acquisition module 230. In this way, the image data from the optical contents imager can supplement the image data acquired in the image acquisition module, or the cameras in the image acquisition module 230 can be eliminated and the image data from the optical contents imager can be used or replace the cameras in the image acquisition module 230. However, because the optical contents imager is located prior to the orientation section 200, the documents passing through the optical contents imager are not necessarily in the proper orientation. Therefore, before further processing of the image data for a particular document, as is discussed further below, the image data may have to be manipulated to reflect the proper orientation of the document.

After the documents are imaged, which is further detailed below, the system transport 75 conveys the documents to a printer module 240 which is controlled by the imaging computer. The printer module 240 includes at least one ink jet printer 241*a*. The printer head of the ink jet printer 241*a* is mounted on an adjustable mount so that the distance between the printer head and the base plate 210 is infinitely adjustable between an upper limit and a lower limit. In response to signals from the imaging computer 260, the printer module 240 prints audit trail data, at step 430 of FIGS. 12 and 13, onto each document. The audit trail information printed on a document includes data particular to the document, such as the batch number for the document, the document number, the transaction number for the transaction of which the document is a member, and the date on which the document was processed. The audit trail information can be used to locate a particular document within a stack of documents. In addition, the audit trail data provides a way for reconstructing a batch of documents if the documents are erroneously mixed with documents from another batch. For example, if an operator drops a stack of documents so that several batches become intermixed, the audit trail information printed on each document can be used to manually sort the documents into the corresponding batches. Generally, it is desirable to only print information on the back face of each document. The printer module may also include a second ink jet printer 241*b* to print additional information on the front face of the documents. If a second printer is used, the imaging computer controls the printers to selectively print on either side of a document.

The system transport 75 conveys the documents from the printer module 240 to a gate 245 that pivots between two positions. Based on signals from the imaging computer 260, the gate 245 directs each document either to a reject bin 250, or to the stacker 300, which sorts and stacks the documents in a plurality of bins. Referring to FIG. 18, based on criteria set by the operator, the stacker directs the documents to one of the bins 305*a*–305*h*.

Figure 15:
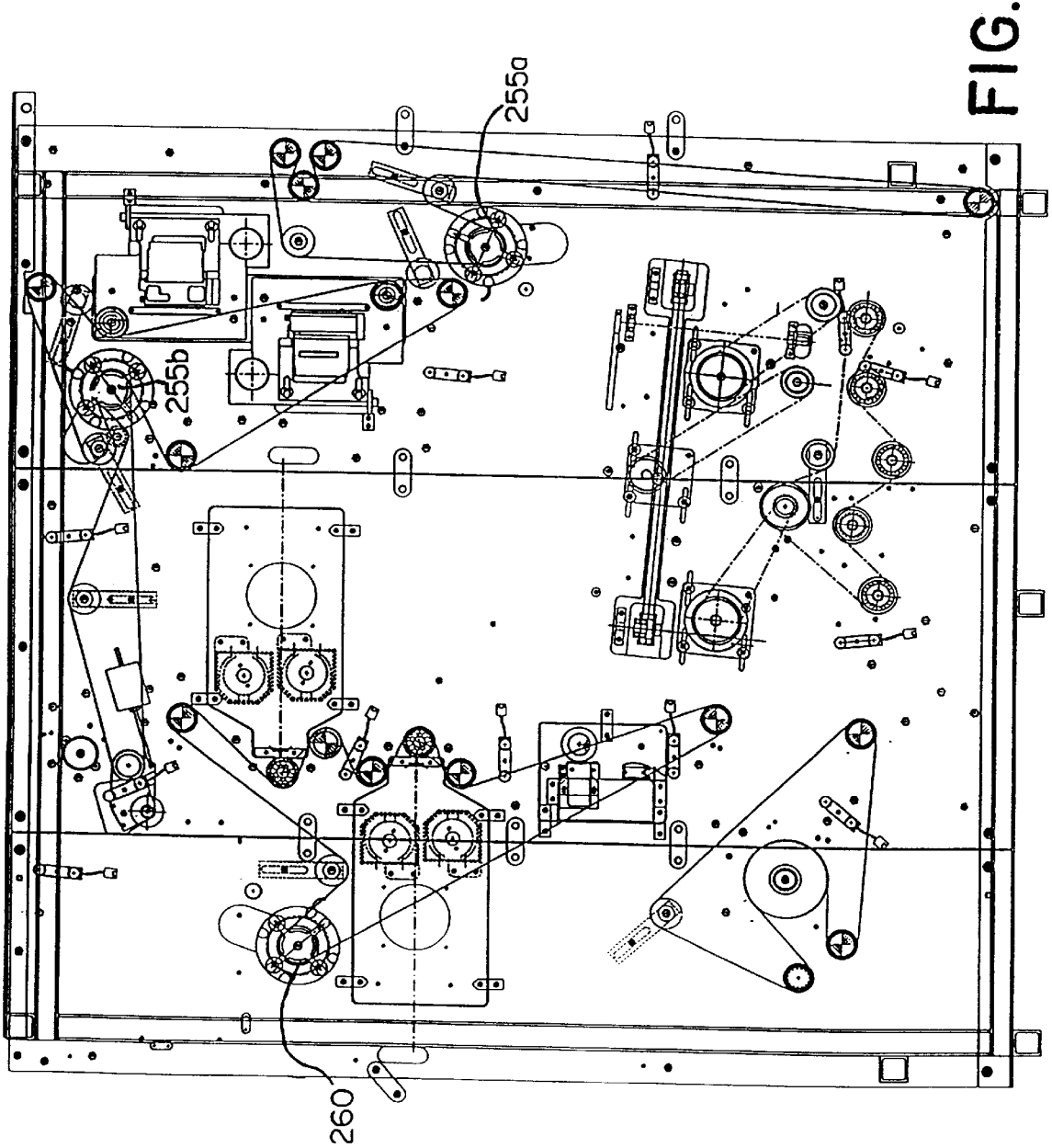
FIG. 15 is an enlarged fragmentary back elevational view of the imaging section of the automated document processing apparatus illustrated in FIG. 1.

The drive system for the system transport 75 in the imaging section is illustrated in FIG. 15, which is the backside of the imaging section. Three motors are used to drive three different sections of the system transport 75 in the imaging section. The first section of the system transport in the imaging section conveys documents from the entry point of the imaging section up to and through the justifier 205 preceding the MICR character reader 220. The second section receives the documents exiting the justifier and conveys the documents through the MICR character reader 220, and the image acquisition module 230. The third section receives the documents exiting the image acquisition module 230 and conveys the documents through the printer module 240 and into either the reject bin 250 or the stacker 300.

Two types of drive motors are used to drive the three sections of the system transport 75 in the imaging section. In the second section a synchronous motor 260 is used to provide precise control of the system transport speed. In the first and third sections precise speed control is not required, so the drive motors in the first and third sections 255*a*, 255*b* need not be synchronous motors. In response to variations in the load of the system transport, the output speed of the synchronous motor 260 does not vary as much as the drive motors 255*a*, 255*b* in the first and third section. For example, the speed at which the first motor 255*a* drives the first section of the system transport 75 may vary as much as approximately plus or minus five percent in response to changes in the load of the system transport. However, the speed of the synchronous motor 260 varies only about plus or minus one percent in response to changes in the load of the system transport. The more accurate speed control of the synchronous motor provides a more consistent document travel speed past the MICR character reader 220, which enhances the read rate of the MICR character reader.

Acquisition and Processing of Image Data

In response to signals received from the system controller 95, the imaging computer 260 controls the operation of the image acquisition module 230 via a frame grabber 280. When the image entry sensor 228 detects the presence of a document, the image entry sensor sends a signal to the system controller 95 indicating the presence of a document. The system controller then sends a signal to the frame grabber 280 indicating whether the document detected by the image entry sensor 228 is to be scanned. At the same time, the system controller sends data to the imaging computer 260 regarding the document. For instance, the system controller 95 sends a signal to the imaging computer 260 indicating what the batch number is for the document and whether the document to be scanned is a check or an invoice.

If the system controller indicates to the frame grabber 280 that a document is to be imaged, the frame grabber sends control signals to the imaging cameras 231*a*, 231*b* and the cameras scan the document to acquire image data. The frame grabber 280 receives the image data from the cameras and then stores the data in memory residing on the frame grabber card 280. The imaging computer microprocessor 265 then transfers the image data from the frame grabber memory 280 into the imaging computer RAM memory 262. Alternatively, the image data can be transferred directly to the RAM of the image computer 260 without storing the data in the memory resident on the frame grabber card.

Figure 12:
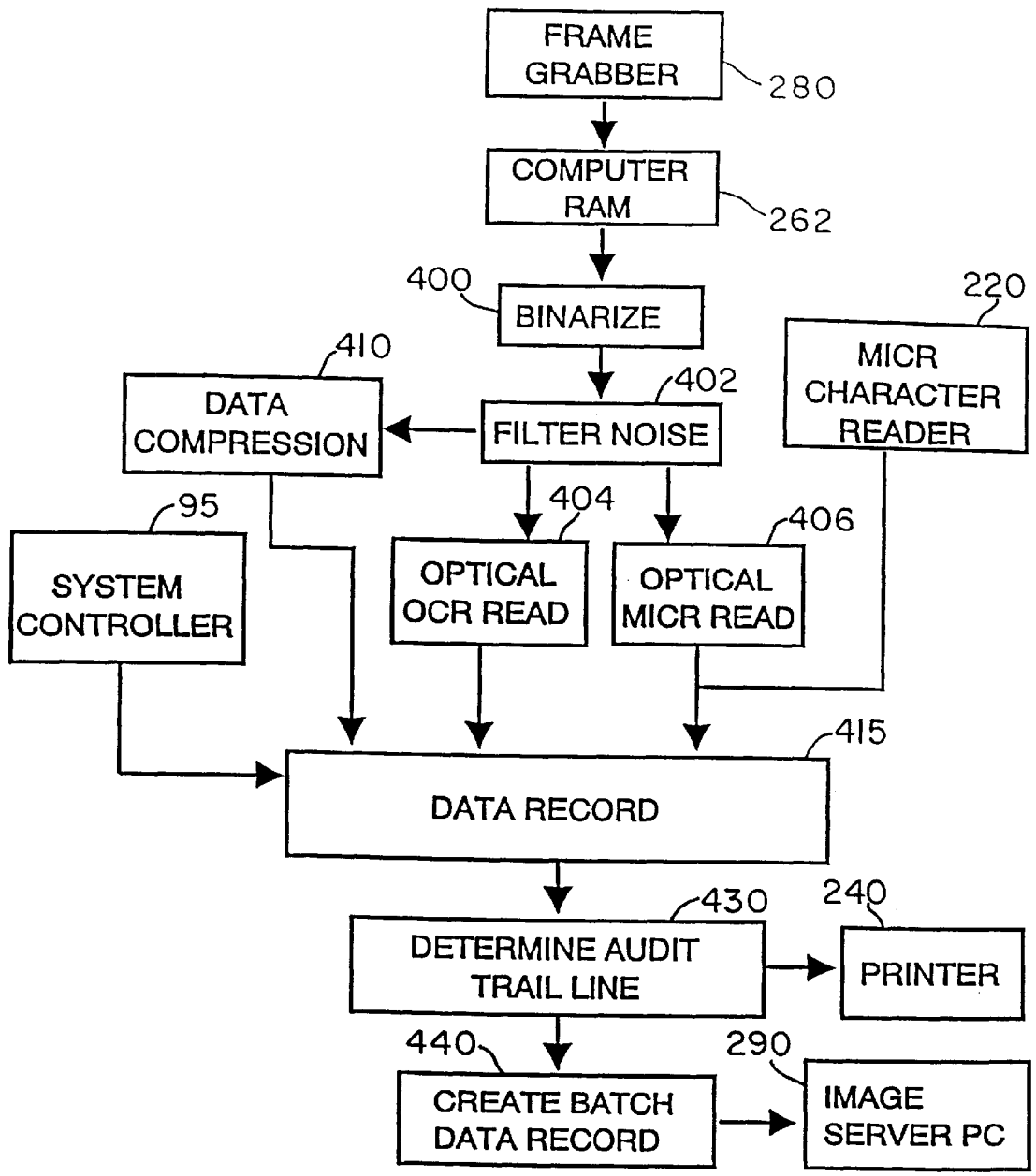
FIG. 12 is a block diagram showing the flow of data acquired in the imaging section of the automated document processing apparatus in a mode in which the image data is binarized and stored in a data record.

Once the image data is transferred to the RAM 262 of the imaging computer 260, the image data is processed by the image computer's microprocessor 265 which may include separate processors MP1, MP2, through MPn. FIG. 12 represents how the data is processed. First, the gray scale data is binarized at step 400 to create a black and white representation of the document image. By binarizing the data, the data for each pixel is converted from an eight bit gray scale representation to a one bit black or white representation, which significantly reduces the space that is required to store the image data. In addition, binarizing the image data operates to highlight the textual portions of the image, which is advantageous for further processing of the image data.

To binarize an image, the gray scale data for each pixel of the image is compared with a threshold. If the gray scale number for a pixel is above the threshold, the gray scale is converted to white. Conversely, if the gray scale number is below the threshold, the gray scale is converted to black.

To account for variations among the different documents being processed, an adaptive threshold may be used so that the binarization threshold is variable for each document. An adaptive threshold uses a different threshold for each particular document based upon a sampling of the image data for the particular document. By using a threshold that is specific to each particular document, the threshold for a document that has a generally dark image will typically be different than the threshold for a document having a generally light image. In this way, the resulting binarized image will more closely reflect the image of the document than if a set threshold is used for all of the documents.

Further, it is preferable to use a locally adaptive threshold, which is a threshold that varies among the different areas of a document. A locally adaptive threshold accounts for variations in the print quality of a document, and variations in lighting, as well as electronic noise that may be produced when image data is acquired. To use a locally adaptive threshold, the image data for each document is broken into 4×4 pixel sets and processed separately by the imaging computer. For each particular pixel set, the imaging computer determines the threshold by sampling the image data for the pixel set. Based on the sampling the imaging computer sets the threshold and binarizes the pixel set.

In addition to binarizing the image data, the image data is filtered at step 402 of FIG. 12 to reduce noise, which eliminates unnecessary background and stray marks from the document image. The noise filtering can be performed either in series or in parallel with the binarization. To filter the data, the imaging computer examines the image data to detect any black pixel that is surrounded by white pixels. If a black pixel is surrounded by white pixels, the imaging computer converts the pixel from black to white. Similarly, if a pair of adjoining black pixels are surrounded by white pixels, both pixels are converted from black to white.

After the image data is binarized and filtered, the imaging computer 260 attempts to read the OCR line at step 404 of FIG. 12 if the document is an invoice or the MICR line from MICR character reader 220 if the document is a check. The OCR line data is necessary for later remittance processing because the OCR line for an invoice includes information about the customer's account and the amount of the invoice. During remittance processing, the customer account number must be known so that any payments can be posted to the correct account. In addition, during remittance processing the invoice amount needs to be known because of the method typically used to determine the amount of a check. To determine a check amount during remittance processing, the amount of a check is either manually or automatically compared with the invoice amount. If the check amount matches the invoice amount, then it is assumed that the check amount was properly read. If the two amounts do not match, then the check amount is rekeyed. Therefore, for further remittance processing the OCR line data, which includes the invoice amount and account number, is needed.

Based on data received from the system controller 95, the imaging computer knows whether a document is a check or an invoice. If the image represents an invoice, the imaging computer 260 processes the image data for the document in order to determine the document's OCR line, which typically appears at the bottom of invoices. The OCR line is a series of characters printed in a uniform predefined typeface of predefined size. Commonly, the typeface is a type referred to as OCR A, however, typeface OCR B, E13B and others can also be read.

In addition, the imaging computer 260 can function to process the image data to read the MICR line of checks so that the MICR line is read both optically at step 406 of FIG. 12 and magnetically by the MICR character reader 220. As previously described, the MICR character reader 220 magnetically reads the MICR line on checks. However, the MICR character reader may be unable to read one or more characters in a MICR line because of imperfections in the magnetic characteristics of the MICR line ink. These magnetic imperfections, however, may not affect the imaging computer's ability to read the MICR line from the optical image data, so that a character that cannot be read magnetically may be readable optically. Therefore, if the MICR character reaches 220 is unable to read a character in a MICR line, the data obtained optically is used to supplement the data obtained from the MICR character reader in an attempt to complete the MICR line data.

Alternatively, it may be desirable to use the imaging computer to verify the results from the MICR character reader 220. By verifying the results, the possibility of checks being processed with improper MICR data is reduced. For this purpose, the MICR line data obtained optically can be compared with the MICR line data from the MICR character reader 220. If there is any mismatch between the optically read MICR line and the results from the MICR character reader 220 the imaging computer indicates that the MICR line was not determined. The system controller 95 then tags the document as having an undetermined MICR line and the document along with the remaining documents in the same transaction are directed to the reject bin 250 or sorted by the stacker 300 accordingly.

After the OCR line or MICR line data for a document is extracted from the image data, the image data for the document is compressed at step 410 of FIG. 12 using Group 4 fax compression commonly referred to as "CCITT Group 4." The compressed image is combined with the data representing either the MICR line or the OCR line, along with data from the system controller 95 to form a data record 415 for the document. The data from the system controller 95 includes information from the envelope from which the particular document was extracted, such as a change of address indication, the presence of a postnet barcode, and the presence of a mark indicating a customer response. The data from the system controller 95 also includes an indication of whether the MICR line and OCR line was completely determined during imaging. Accordingly, the data record for a document includes the image data, the MICR or OCR line, an indication of whether the OCR or MICR line is complete, and miscellaneous information obtained during the processing of the document, such as customer response data in the form of a change of address, or a check mark in a response mark.

Figure 13:
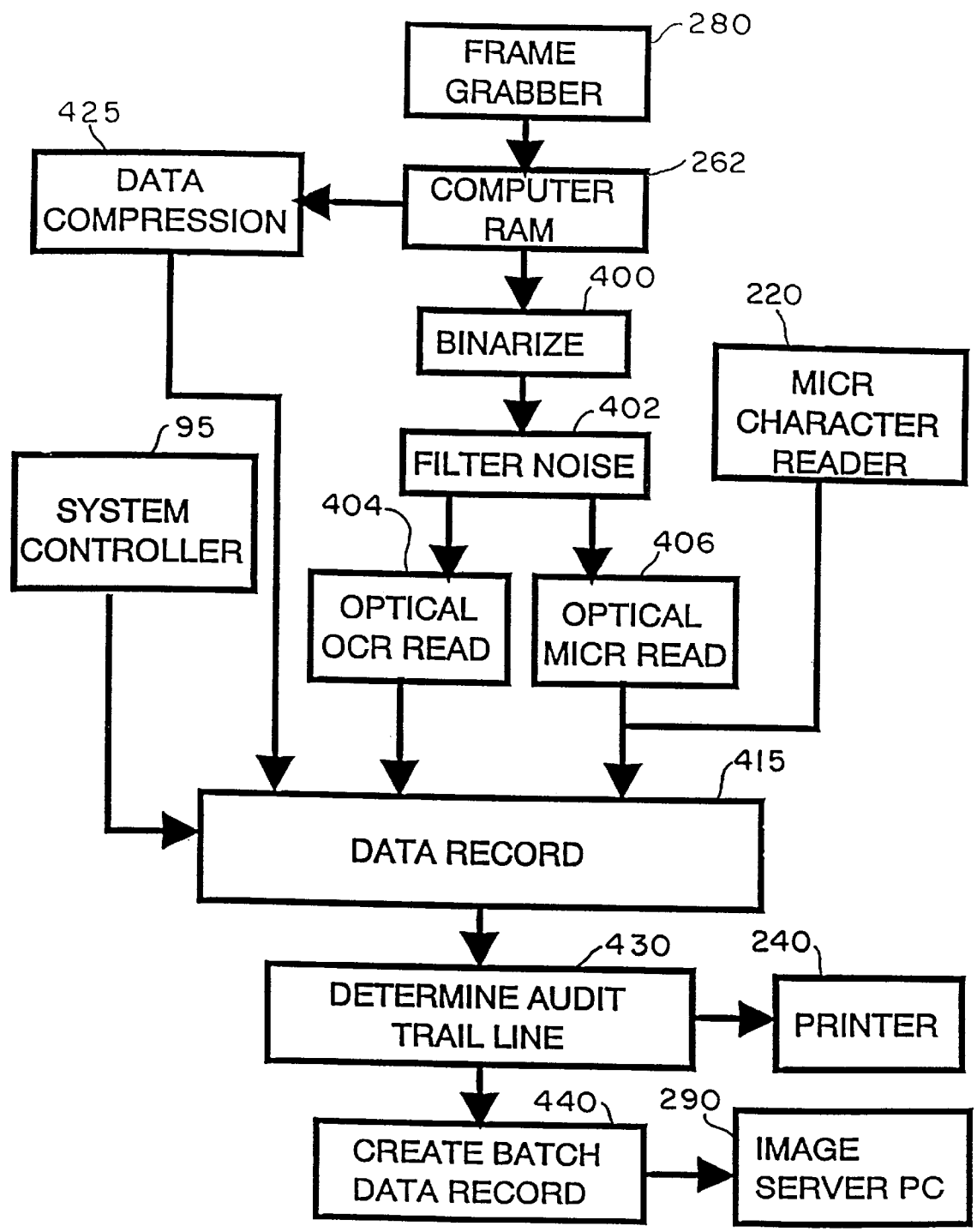
FIG. 13 is a block diagram showing the flow of data acquired in the imaging section of the automated document processing apparatus in a mode in which the gray scale image data is retained and stored in a data record.

Alternatively, it may be desirable to store the gray scale images of the documents in the data records rather than the binarized and filtered images. FIG. 13 illustrates the flow of data when the gray scale image is stored. To store the gray scale images, a copy of the gray scale image data for each document is binarized at step 400 and filtered at step 402 as described above so that the image computer can determine the MICR or OCR line. The gray scale image data is then compressed at step 425 using JPEG data compression, and the image data is combined with other information to create a data record 415, as previously described for the binarized and filtered images. The binarized and filtered image is then discarded from the imaging computer's RAM.

As will be described later in more detail, the documents are sorted and maintained in groups referred to as batches, which are identified by a unique batch number. The image data for a batch of documents is organized and maintained into batch data record files referred to as batch files at step 440 of FIGS. 12 and 13. The batch files are organized so that the organization of the images in a particular batch file directly corresponds to the organization of the documents in the batch.

A complete batch file includes a batch header and the data records for each of the documents in the corresponding batch. The batch header includes information that is common to all of the documents in the batch, such as the batch number, the date the documents were processed, and the number of documents in the batch. Once all of the records have been appended to a batch file, the batch file is exported from the imaging computer 260 to an image file server 290, in the form of a personal computer, PC, via an ethernet connection.

Difficulties may arise when imaging the documents. For example, the MICR module 220 and the imaging computer 260 may not be able to read the MICR line for a check or the OCR line for an invoice. If such a problem arises, the image, along with the data that was ascertained from the image may be exported to the respective batch file for the document and the document may be sorted with the other documents in the batch. In this way, the document and the image data for the document are available for remittance processing, at which time the missing information can be manually read and entered into the data record for the document.

It may, however, be desirable to separate the documents for which the MICR line or OCR line was not determined from the documents for which the MICR or OCR line was determined. To do so, documents for which the MICR or OCR line is not determined are assigned to a separate batch, along with the corresponding documents in the same transactions. In this way, the documents are sorted into so called "clean" and "imperfect" batches. The documents in the clean batches have been properly imaged and the MICR line is known for the checks and the OCR line is known for the invoices. An unclean batch is made up of transactional pairs of documents that have been properly imaged, but the MICR line or OCR line has not been determined for at least one of the documents in the transactional pair. If the documents are separated into clean and unclean batches, the image data for the documents is similarly separated into separate batch files corresponding to the batches of documents. In this way, the batches of documents and the image data for the documents are similarly separated and organized.

Alternatively, if the MICR line or OCR line is not fully read for a document, the document along with the other documents in the same transaction may be directed to a reject bin. If documents are directed to a reject bin, then the image computer 260 discards the image data for the documents in the transaction.

Figure 16:
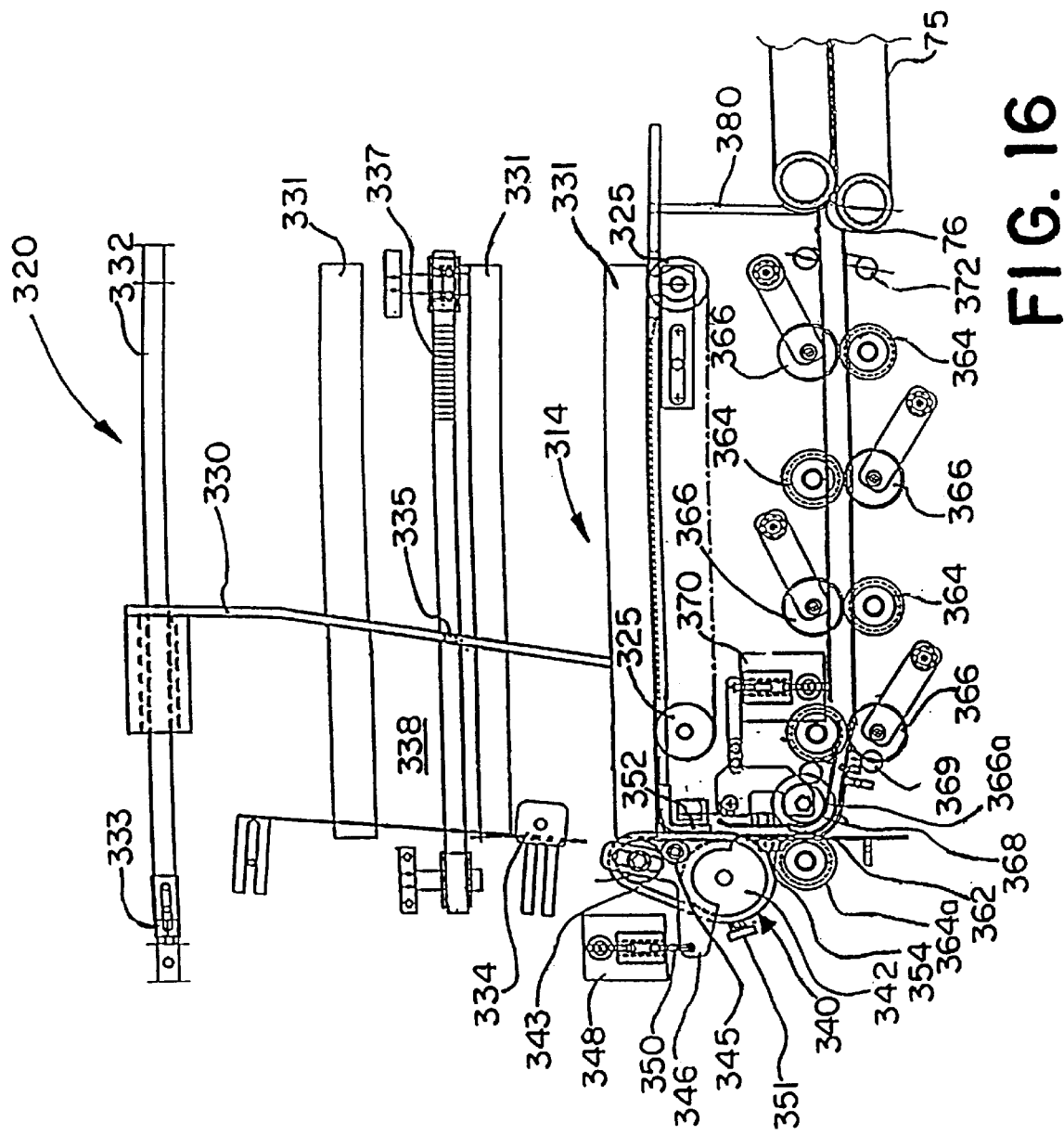
FIG. 16 is an enlarged fragmentary front elevational view of the document feeder of the automated document processing apparatus illustrated in FIG. 1.

As illustrated in FIGS. 14 and 16, the imaging section also includes a document feeder 320. The document feeder operates in two modes. In one mode the document feeder 320 feeds batch tickets into the system transport, so that batch tickets are sorted in the stacker 300. In a second mode, the document feeder 320 operates as a refeeder to feed ordered and oriented transactional groups of documents into the imaging section.

Batch Ticket Feeding Mode of Operation

Generally, to facilitate remittance processing, batches of documents are separated by various control documents such as a batch header ticket that may be placed at the beginning of each batch, a batch trailer ticket that may be placed at the end of each batch and a control ticket that may be placed behind the batch header ticket. To automatically feed the various control documents into the different batches, the document feeder 320 operates as a batch ticket feeder. In this mode of operation, the document feeder 320 feeds batch tickets into the document path so that the batch tickets enter the system transport 75 just prior to the justifier 305.

The batch tickets are generally taller than most of the documents in the batches. Consequently, when several batches of documents are stacked together, the batch tickets separating the individuals batches are readily identifiable. The batch number is printed in magnetic ink on the face of each batch ticket in the same location as the MICR line on checks and hence can be read by the MICR character reader 220.

In the batch ticket feeder mode, the document feeder 320 can operate to meet various requirements for placing a number of batch ticket and/or other control documents at the beginning of each stack of documents in the stacker 300. In a basic mode, two batch header tickets are fed for each batch of documents, one batch header ticket for the invoices in a batch and one batch header ticket for the checks in the batch. The batch header tickets are loaded into the document feeder 320 so that the two corresponding batch header tickets for each batch of documents are adjacent. In addition, the batch header tickets are loaded into the document feeder so that the batch ticket number is in a predetermined orientation to permit proper imaging as will be discussed below.

In addition to the basic mode of operation, it may be desirable to have a batch trailer ticket placed at the end of each batch of checks and at the end of each batch of invoices. To do so, a corresponding batch trailer ticket is placed in front of each batch header ticket when the batch tickets are loaded into the document feeder 310. The document feeder 320 feeds a batch trailer ticket to the bin for a batch of invoices and a batch header ticket is then fed on top of the batch trailer ticket. Similarly, a batch trailer ticket is fed into a bin for the checks in the same batch and a batch header ticket is fed on top of the batch trailer ticket. After the checks and invoices for a batch are fed into the two bins, the batch trailer ticket is the lead document for the batch of checks and the batch of invoices. When the operator removes the completed batches of checks and invoices from the bins, the operator can manually move the respective batch trailer tickets to the back for both the batch of invoices and the batch of checks. In this way, each batch of checks and each batch of invoices has a batch header ticket at the front of the batch and a batch trailer ticket at the end of the batch.

In yet another variation, it may be desirable to place a control ticket into each batch of invoices and checks. Typically, the control ticket is placed behind each batch header ticket. Therefore, a control ticket is placed into the document feeder 320 behind each batch header ticket. The document feeder then feeds a batch header ticket and a control ticket into each bin.

Each bin in the stacker 300 has a bin sensor that sends a signal to the system controller if the bin is empty. In response to an indication from a bin sensor that a bin is empty, the system controller prompts the document feeder 320 to feed a batch ticket. The batch tickets flow from the document feeder 320 to the justifier 205, which justifies an edge of each batch ticket relative to the base plate 210 so that each batch ticket is maintained in proper position for magnetic imaging. The batch tickets are then conveyed past the MICR character reader 220 which determines the characters that make up the batch ticket number. The MICR character reader then communicates the batch ticket number to the imaging computer 260 which communicates the batch ticket number to the system controller 95. The system controller then uses the batch number to monitor and control the processing of the corresponding batch of documents. For example, if the MICR character reader 220 reads a batch ticket MICR line and determines that the batch ticket number is 1000; the information is then communicated to the imaging computer and in turn to the system controller 95. The system controller then assigns checks and invoices into batch 1000. When a document enters the image acquisition module 230, the system controller informs the imaging computer that the document should be imaged and assigned to batch 1000. As this example illustrates, the batch ticket MICR data is communicated back and forth between the imaging computer after the MICR character reader 220 images the batch ticket.

From the MICR character reader 220, the batch tickets are conveyed past the image acquisition module 230 and image data is acquired for the batch tickets. After being imaged, the batch tickets are conveyed to the printer module 240, but the printer module 240 generally does not print information on the batch tickets. From the printers, the batch tickets are conveyed to the stacker 300, which sorts the batch tickets into the empty bins.

As previously described in the basic mode, one batch ticket is fed into each empty bin in the stacker. The invoices for a batch are then fed into a bin and stacked on top of the batch ticket, and the checks for the batch are fed into the bin containing the batch ticket corresponding to the same batch and stacked on top of the batch ticket. For example, referring to FIG. 18, a batch ticket having batch ticket number 1000 may be fed into bin 302g. A corresponding batch ticket having batch number 1000 is then fed into bin 302h. As documents are processed, the system controller 95 assigns certain documents to batch number 1000. The checks and invoices for batch number 1000 are separated and sorted into bins 302g and 302h. When batch number 1000 is completed, the checks for batch number 1000 are stacked on the batch ticket in bin 302g and the invoices for batch number 1000 are stacked on the batch ticket in bin 302h.

Once a batch has been completed and stacked, the system controller 95 sends a signal to the stacker to light an indicator light to indicate to the operator that the bins in which the batch is stacked are full. The system controller 95 then directs the next batch of documents to the next two available bins. A pair of bins is available if both bins are empty except for a batch ticket. For example, if bins 302e and bins 302f each have a batch ticket number 1001, and no checks or invoices have been stacked in bins 302e and 302f, then bins 302e and 302f are available bins. Once batch 1000 is finished being sorted and stacked in bins 302g and 302h, the system controller will indicate that bins 302g and 302h are full. The system controller will then direct the documents in batch 1001 into bins 302e and 302f. Once the operator removes the checks and invoices in batch number 1000 from bins 302g and 302h, a sensor will indicate that the bins are empty. The system controller 95 will then prompt the document feeder 320 to feed a batch ticket into bin 302g and a corresponding batch ticket into bin 302h so that the two bins will be available again.

It may be desirable to sort a batch of documents so that the transactional pairs are stacked together instead of separating the checks and invoices into separate stacks. In such a case, an entire batch of checks and invoices is sorted to a single bin and stacked in transactional sequence. In other words, the batch is sorted so that the checks and invoices for a batch are in the same stack, and the documents in each transaction are maintained together, i.e., adjacent one another. Only one batch ticket is typically used for a batch of documents when the documents within the batch are not separated. The batch ticket is fed into the bin, and the documents in the batch are stacked on top of the batch ticket.

Generally, the apparatus 10 sorts an entire batch of documents before beginning to sort a different batch of documents. However, different batches of documents may be sorted concurrently. For example, documents may be sorted to selected output bins based on various markings detected on the documents, such as change of address boxes or barcodes on invoices. The documents may also be sorted based on other criteria, such as document length to account for size differences between business checks and personal checks. In addition, as previously described, it may be desirable to sort documents based on whether the transactional pairs of documents are clean or unclean, i.e., whether the MICR line and OCR line has been determined for the documents in the transaction.

The following example illustrates the process of concurrent sorting. Clean documents are grouped into batch 1000, and unclean documents are grouped into batch 1001. The clean checks and invoices in batch 1000 are separated and sorted into bins 302g and 302h. Similarly, the imperfect checks and invoices from batch 1001 are separated and sorted into bins 302e and 302f. As the apparatus 10 processes documents, the clean transactions are sorted into bins 302g and 302h. When an unclean transaction is identified, the transaction is sorted into bins 302e and 302f. The next transaction that is clean is sorted to bins 302g and 302h. The stacker 300 continues to switch between the bins in this way as transactions from different batches arrive at the stacker.

As shown in FIG. 14, the batch tickets are fed to the stacker 300 along the same document path that the invoices and checks are transported. During normal operation of the apparatus 10, the gap between adjacent checks and invoices is too small for a batch ticket to be fed into the flow of documents along the document path. Further, it is not desirable to stop the processing of the checks and documents to feed batch tickets.

One method of feeding batch tickets without halting the processing of checks and invoices utilizes the time delay that occurs during the initial startup of the machine and during recovery after a jam. When the apparatus is first started, there are no documents in the system transport 75. Therefore, when the apparatus 10 is initially started, there is a delay between the time the envelopes are placed into the input bin 16 and the time that the documents reach the point where the batch tickets are fed into the system transport. During this delay, the document feeder 320 feeds batch tickets into the system transport. The document feeder continues to feed batch tickets until either all of the empty bins in the stacker 300 are full or until a sensor indicates the presence of a check or document in the system transport 75 in the imaging section.

Similarly, the document feeder 320 can also feeds batch tickets into the system transport during the recovery period after a jam. When a jam occurs, the apparatus continues to process the documents and the transactions that are downstream from the jam (i.e., between the jam and the stacker 300). However, the apparatus halts the processing of the document that caused the jam and the remaining documents in the same transaction, along with all of the documents upstream from the jam (i.e., between the jam and the envelope feeder 15). Therefore, if a jam occurs upstream from the point in the system transport where the batch tickets are fed, there is a delay between the time the operator restarts the apparatus after clearing the jam and the time the checks and documents reach the point where the batch tickets are fed into the system transport 75. During this delay, the document feeder 320 feeds batch tickets into the system transport as long as there are empty bins in the stacker 300 or until a sensor indicates the presence of a check or invoice in the system transport in the imaging section.

A second method for feeding the batch tickets without halting the processing of checks and documents utilizes the breaks in the flow of documents that occur when a transaction is outsorted or if a transaction is reunited with its envelope after extraction. As previously described, during the processing of the documents, certain envelopes are directed to the outsort bin 40 and certain transactions are directed to the reunite bin 125. When an envelope or transaction is outsorted, a gap occurs in the continuous flow of documents along the system transport 75. This gap is monitored by the system controller 95, which, in turn, indicates to the document feeder 320 when a batch ticket should be fed so that the batch ticket merges in the gap in the document flow created by the outsorted transaction. As with the first method for feeding batch tickets, the document feeder feeds batch tickets into the gaps in the document flow as long as there are empty bins in the stacker.

Refeeder Mode of Operation

The second mode of operation for the document feeder 320 is the refeeder mode. In the refeeder mode the cutting extraction and orientation sections of the apparatus 10 are not used. Instead a stack of ordered and oriented documents is placed in the document feeder 320. The document feeder 320 serially feed the documents into the system transport 75 and the documents are imaged, sorted and stacked.

The refeeder mode is used to process singles as well as other types of transactions such as multi transactions, invoice only transactions and check only transactions. The term multi includes three different types of transactions: two or more checks and one invoice, two or more invoices and one check, and finally, two or more checks and two or more invoices. A check only transaction is a transaction that does not have an invoice. similarly an invoice only transaction does not have a check.

The documents are placed in the document feeder so that the documents are properly oriented for proper imaging. In addition, the documents in each transaction are in a predetermined sequence, such as invoices first for single and multi transactions.

At least one batch ticket is placed in front of each batch of documents so that the batch tickets separate the different batches of documents in the document feeder 320. As previously described, in the basic mode of operation, two batch tickets are used for each batch and the checks and invoices for each batch are sorted into separate bins. When two batch tickets are used for a batch, both batch tickets are placed in front of the batch of documents.

When operating in refeeder mode a separate control document is typically included in each batch because of the variety of transaction types that are processed. The control document has a MICR line that identifies the job type for the particular batch. Job type refers to the type of transactions in the batch, such as multi or checks only. The MICR character reader 220 reads the MICR line of the control ticket, and communicates the information to the imaging computer 260, which in turn communicates the information to the system controller 95. The system controller uses the job type data to track the transactional boundaries for the documents in the batch.

In the refeeder mode, controlling the distance between adjacent documents is generally more important than when the document feeder is operating in the batch ticket feeder mode. Therefore, as detailed below, the document feeder operates to control the gap between adjacent documents.

Referring now to FIGS. 14 and 16, the details of the document feeder 320 are shown in greater detail. To begin processing a batch of documents 316, an operator places a stack of documents 16 disposed in face-to-face engagement on an input conveyor 324 located at the bottom of the input bin 314 of the document feeder 320. The input conveyor 324 moves the documents toward a feed assembly 340 that functions to feed the documents one at a time from the stack 316 along a document feed path. The input conveyor 324 comprises a pair of parallel belts 326 that are carried on a pair of pulleys 325 which are driven by a motor 327.

The document bin 314 also includes a series of plastic glide strips 331 mounted on a wall surface of base plate 328 of the apparatus 310. The glide strips 331 are oriented generally parallel to one another and extend longitudinally of the document bin to provide a glide surface for the stack of documents conveyed by the conveyor belts 326 through the bin toward feed assembly 340. As the stack of documents is moved toward the feed assembly, the glide strips provide a low friction surface upon which the document stack rests and moves.

The stack of documents 316 is manually loaded into the bin 314 in a predetermined orientation so that the documents can be properly imaged. In the present instance, the documents are oriented so that the bottom edge of each document rests upon the glide strips 331 and the front face of the document, face toward the left of the document feeder, when viewed from the perspective of FIG. 14.

One end of the stack of documents 316 on the input conveyor 324 is supported by a document pusher 330 so that a face surface of the last document in the stack rests upon pusher 330. The document pusher 330 is a bent metal plate that may be removably positioned against the end of the stack of documents 316. The pusher 330 is bent at a selected angle of orientation relative to vertical to enable the stack of documents to lay back upon the pusher as the document stack is conveyed through the bin. The amount of bend in the pusher also serves to control the contact force with a motor-driven thumper feed wheel 334 disposed at the other end of the bin. The document pusher 330 is rotatably mounted on guide rail 332 that extends longitudinally of the bin. The pusher 330 is freely slidable along the guide rail 332. The pusher also includes an end tab 335 that is positioned to register with the tracks of a toothed document timing belt 337. As such, when the stack of documents is initially loaded into the bin, the pusher is rotated about guide rail 332 to disengage tab 335 of the pusher 330 from the tracks of the timing belt 337. The pusher 330 is then slid longitudinally along guide rail 332 into contact with the document stack. The pusher 330 is then rotated back into a drive position so that the tab 335 engages the tracks of the timing belt 337. The timing belt drives the pusher 330 so that the document pusher 330 moves longitudinally along the guide rail 332 as the stack of documents advances toward the feed assembly 340. A sensor 333 at the end of the guide rail 332 detects when the document pusher 330 reaches the end of the guide rail, which indicates that the stack of documents has been fed into the feed assembly 340. The system controller then indicates to the operator that the input conveyor 324 is empty.

The timing belt 337 that drives the document pusher 330 is driven by the same motor 327 that drives the input conveyor 324 so that the timing belt and the input conveyor can be driven to move at the same speed. In this way, the document pusher is driven by the timing belt 337 to push the stack of documents, together with the input conveyor 324, toward the feed assembly 340 while the document pusher also functions to support the back end of the stack of documents.

The front end of the stack of documents is moved into engagement with the motor-driven thumper wheel 334. The thumper wheel 334 is a generally square shaped wheel with rounded corners. The thumper wheel is driven by stepper motor 341 which also serves to drive the feed assembly 340. The thumper wheel provides eccentric cornered surfaces which function as a cam for supporting the stack without creating drag that would prevent the feed assembly 340 from engaging the front-most document. The thumper wheel 334 also functions to vibrate the stack to encourage the shingling downward of the front-most documents in the stack. The thumper wheel may be mounted on a spring biased pivot arm to help control the contact force with the document stack.

The documents on the input conveyor 324 enter the document path between the feed assembly 340 and an opposing, spring-biased retard 352. The leading document on the input conveyor 324 contacts the feed assembly 340, which forces the leading document between the feed assembly and the retard 352. The retard is spring biased toward the feed assembly 340.

The feeder assembly 340 is a belt and pulley drive assembly. A drive pulley 342 is connected to stepper motor 341 and thereby functions to drive the feeder assembly 340. The drive pulley 342 and an idler pulley 344 are spaced and supported by an adjustable yoke assembly 346 sandwiched between a pair of L-shaped brackets 346. A document drive belt 343 is carried on the drive pulley and idler pulley. The drive pulley 342 is pivotally mounted in fixed position relative to the base 338. The idler pulley 344 is not connected to the base 338, but is rotatably mounted at the terminal end of the yoke assembly 346. Because the idler pulley 344 is not mounted to the base 338, the feeder assembly 340 pivots relative to the base 338 about the central axis of the drive pulley 342. An extension arm on the yoke assembly 346 is connected to a spring 350. The spring 350 biases the feeder assembly 340 toward the retard 352, and against the stack of documents on the input conveyor 324.

The L-shaped brackets 346 are also connected to a feed pressure indicator 348 that is used to monitor the contact force of the documents on the input conveyor 324 against the drive belt 43 of the feed assembly 340. The force of the stack of documents against the feed assembly 340 causes the feed assembly 340 to pivot about the central axis of the drive pulley 342. The spring 350 opposes the pivoting of the feed assembly in response to the document pressure. The feed pressure indicator 348 is a linear variable differential transformer ("LVDT") that monitors the rotation and position of the yoke assembly 346 thereby determining the extension of the spring 350. The spring extension is proportional to the force applied to the spring. Therefore, based on output from the feed pressure indicator 348, the controller 315 is able to determine the force applied to the spring and thereby determine the force applied against the feed assembly 340 by the documents on the input conveyor 324. Although a position indicator is used in the present embodiment to determine the force of the documents against the feed assembly 340, alternative indicators can be used. For instance, a device that monitors force more directly, such as a strain gauge, can be used.

By monitoring the force of the documents against the feeder assembly 340, the system controller 95 can function to control the speed of the motor 327 that drives the input conveyor 324 and the timing belt 337 driving the document pusher 330. For instance, if the document force against the feeder assembly is less than a predetermined amount, the speed of the motor 327 may be adjusted to increase the feed of the documents toward the feeder assembly 340.

A cleaning brush 351 is positioned in engagement with the feed conveyor belt 343 to clean ink and other debris from the belt during operation. A fixed bearing 345 is disposed on the inside of the feed conveyor belt 343 between the drive pulley 342 and the idler pulley 344. The fixed bearing 345 engages the inner surface of the feed conveyor belt 343 opposite the retard 352 in order to maintain the nip formed between the belt 343 and the retard 352 during pivotal movement of the feeder assembly 340. Otherwise, the belt 343 may have a tendency to move out of operable contact with the retard 352.

To ensure that a leading document and the next trailing document from the stack 316 are not fed simultaneously, the retard 352 is designed to have a lower coefficient of friction than the feeder assembly 340. In addition, the coefficient of friction at the face-to-face contact between the leading and trailing documents must be less than the coefficient of friction between the trailing document and the retard and therefore less than the coefficient of friction between the feed assembly 340 and the leading document. Accordingly, when the lead document is in contact with the feeder assembly 340, the trailing document is in contact with the retard 352. Because the coefficient of friction of the feed assembly 340 is greater than the coefficient of friction of the retard 352 and is also greater than the coefficient of friction between the documents, the leading document is fed into the document path before the trailing document. In effect, the feeder assembly causes the leading document to slide away from the face-to-face contact with the trailing document while the retard functions to hold the trailing document back. Accordingly, only one document at a time is fed into the document path.

From the feeder assembly 340, the documents are fed one at a time into a pitch or gap compensation zone 360. As the documents enter the compensation zone, the documents pass between a pair of document guides 368, and past a feed sensor 354. The feed sensor 354 is an infrared sensor employing an infrared emitter on one of the document guides 368 and an infrared receiver on the opposing document guide. The feed sensor 354 senses the existence of a document, including a leading and/or trailing edge of the document, within the document guides 368 at the location of the sensor and sends an output signal to the system controller 95.

The feed sensor 354 is used to determine and control the documents leaving the feeder assembly 340. If the flow of documents past the feed sensor is interrupted, the feed sensor functions to indicate a lack of document flow. The system controller 95 then stops the feeder assembly stepper motor 341 and indicates to the operator that documents may be jammed in the feed assembly 340 or, depending on the status of the sensor 333 along guide rail 332 in the input bin 314, that no documents remain on the input conveyor 324.

After passing the feed sensor 354, the documents enter a hard nip 362 formed between a pair of rollers 364a and 366a. One of the rollers is a drive roller 364a, and the other is a spring-biased idler roller 366a that is linked to a LVDT to enable the system controller 95 to monitor the spacing between rollers 364a and 366a at the nip 362. The frictional force between the rollers 364a, 366a and the documents is greater than the frictional force between the feed assembly 340 and the documents. As a result, the rollers 364a, 366a take control of transporting a document from the feed assembly 340 once the document enters the hard nip 362. Employing a hard nip is advantageous for the purpose of achieving aggressive control over documents in the compensation zone. The use of a hard nip results in more consistent gaps between documents for purposes of maintaining consistent uncompensated feeding.

To adjust the gap between two successive documents, especially, a leading document and a trailing document, the speed of the trailing document relative to the leading document may vary for a selected period of time. After the leading document is conveyed through the compensation zone 360, the leading document enters the system transport 75. Once the leading document enters the system transport 75, the system transport controls the speed at which the leading document is transported. When the leading document enters the system transport, the speed of the trailing document is still controlled by the rollers 364, 366 in the compensation zone. The speed of the trailing document being conveyed through the compensation zone is adjustably variable from approximately 35 to 100 inches per second while the leading document is conveyed by the system transport 75 at a constant rate of about 150 inches per second.

The gap between the leading and trailing documents is determined using two sensors. The two gap sensors are located at opposite ends of the compensation zone 360. The first gap sensor, referred to as a compensate entry sensor 369, is located toward the beginning of the compensation zone adjacent to the first pair of rollers 364a, 366a. The second gap sensor, referred to as the system entry sensor 372, is located at the end of the compensation zone, adjacent the system transport 75. Both of the gap sensors are infrared sensors that straddle the document path, with an infrared emitter on one side of the document path and an infrared receiver on the opposite side of the document path.

If the gap between documents is not within a preset range, the system controller 95 determines the rate at which the trailing document should be conveyed through the compensation zone 360 to adjust the gap between the leading and trailing documents. The system controller 95 determines the necessary speed of the trailing document based on the pitch between the leading and trailing documents, the distance between the gap sensors 369 and 372, the distance between the system entry sensor 372 and the system transport 75, and the speed at which the system transport 75 transports the leading document. Based on the determination of the necessary speed, the system controller 95 controls the compensation zone stepper motor 363.

A thickness indicator 370 also measures the thickness of the documents while the documents are conveyed through the compensation zone. The thickness indicator is an LVDT device similar to the feed pressure indicator 348. The thickness indicator 370 senses whether one, two or multiple documents are being fed simultaneously through the compensation zone. In general, if a document thickness is above a predetermined thickness, the controller either stops the feeder 320, or outsorts the document or documents to the reject bin 250. More specifically, the thickness detector may function to detect a double feed, a multiple or triple feed as well as an imperfect single having, for example, a foreign substance such as tape. If an improper document feed is detected, the system controller 95 will cause the improper document or tickets to be directed to the reject bin 250.

Jam Recovery

Generally, when a jam occurs, the apparatus halts the processing of the document or documents that caused the jam, along with the documents in the same transaction and the documents upstream from the jammed documents (i.e. between the jammed document and the envelope feeder 15). The apparatus 10 continues to process the documents that are downstream from the documents in the transaction that has the jammed document (i.e. the documents between the stacker 300 and the documents in the transaction that has a jammed document). The operator then removes the jammed document or documents as well as the documents in the same transaction and places the documents in the reject bin 250. After clearing the document path, the operator restarts the apparatus.

The general jam recovery procedure operates adequately when the jam occurs upstream from the MICR character reader 220 in the imaging section. However, the general jam recovery procedure can alter the direct correspondence between the batch files of image data and the actual batches of documents. For instance if the trailing document in a transaction is a check and the check jams at the image acquisition module 230, the invoice in the same transaction will continue to flow through the imaging section and into the stacker 300. If the check is simply removed from the document path and placed in the reject bin 250, the transaction is split. Further, the document that caused the jam and the other document in the same transaction has been assigned a transactional sequence number in a particular batch number, and the printer 240 has printed the same information on any document in the transaction that was processed through to the sorter. Therefore, if the documents in the transaction are simply removed and placed in the reject bin 250, the transactional sequence for the batch of documents will be discontinuous and the batch file will contain imaging data for documents that have been removed from the batch. To avoid such problems, the jam recovery procedure is altered if a jam occurs downstream from the MICR character reader 220.

If a jam occurs downstream from the MICR character reader 220, the system controller identifies the last complete transaction to be processed and sorted in the stacker 300, referred to as the last complete transaction. The system controller 95 then retrieves the image data for the documents in the last complete transaction and displays the images of the documents on the monitor 290. The system controller 95 also indicates the bin or bins in which the last complete transaction is located by either displaying the bin numbers on the monitor or by lighting an indicator light on the proper bins. The operator then searches for the documents in the last complete transaction that are in the stacker 300, and retrieves any documents that are stacked on top of the documents in the last complete transaction. However, the documents in the last complete transaction are left in the stacker. The operator then removes all of the documents that are in the document path downstream from the MICR character reader 220. The documents that the operator removed from the document path and the stacker are not placed in the reject bin. Instead, the operator serially hand feeds the documents into a drop slot feeder 380 in response to instructions displayed on the monitor 290.

The drop slot feeder 380 is located at the right end of the documents feeder 320 when viewed from the view in FIGS. 14 and 16. The drop slot feeder 380 is a longitudinally elongated rectangular conduit extending between the rear end of the document feeder input bin 314 and the system entry nip 76 where the documents from the document feeder enter the system transport 75. The end of the drop slot feeder 380 curves adjacent the system entry nip 76. The curved end directs the document in the drop slot feeder from a generally vertical orientation to a generally horizontal orientation so that the document can more easily enter the system transport 75. The drop slot feeder 380 registers with a slotted aperture in the bottom of the document input bin 314. In this way, a document that is dropped into the slot in the input bin 314 passes through the drop slot feeder 380 and is fed into the system transport.

After the operator has removed the documents from the document path and the stacker 300, the operator indicates to the system controller that the jam has been cleared. The system controller 95 then restarts the system transport 75 in the imaging section and directs the documents remaining in the imaging section to the reject bin 250.

The system controller 95 has information such as the OCR number, the MICR number and/or the image of the document removed by the operator during jam recovery. The system controller also knows the correct sequence for the documents that the operator removed during jam recovery. Therefore, the system controller can prompt the operator as to the proper sequence for manually feeding the documents the operator removed during jam recovery.

After the transport has been clear in the imaging section, the system controller 95 displays information regarding the first document that the operator is to feed into the drop slot feeder 380 and prompts the operator to feed the document. A sensor 207 prior to the justifier 205 sends a signal to the system controller indicating the presence of the document that was fed into the system transport 75 through the drop slot feeder 380. The system controller then displays information regarding the next document that the operator should feed into the drop slot feeder 380. This process continues until all of the documents removed during jam recovery are manually fed to restore the sequence of the documents in the batch that was interrupted by the jam. By doing so, the direct correspondence between the actual documents in the batch and the image data in the corresponding batch file is also restored.

The apparatus is extremely versatile for processing documents. For example, the apparatus can function to process documents contained in envelopes or the apparatus can be used to process documents that have already been removed from the envelopes by the use of the midstream document feeder. In addition, the apparatus can be easily modified to eliminate the extractor if stacks of already open, but randomly oriented, mail needs to be processed and oriented prior to imaging. Furthermore, the apparatus may be used to process single documents or transactions having only a single document, such as a proxy statement. If only single document transactions are processed, the transactional boundaries become self-defined to the single document. As such, any complication in tracking and maintaining transactional boundaries between multiple document transactions is thereby eliminated.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. An apparatus for processing documents contained within envelopes comprising:
    A) a document transport for conveying documents and envelopes along a selected path of movement;
    B) an extractor along the path of movement for extracting the documents from the envelopes;
    C) an image acquisition system along the path of movement for acquiring images of at least selected documents extracted from the envelopes and conveyed along the path of movement; and
    D) a non-volatile image storage medium for storing images of the selected documents acquired by the image acquisition device.

2. The apparatus of claim 1 wherein the image acquisition system includes a magnetic reader for reading selected magnetic images from selected documents.

3. The apparatus of claim 2 wherein the image acquisition system includes an optical reader for acquiring optical images of selected documents.

4. The apparatus of claim 1 wherein the image acquisition system includes a magnetic image reader for acquiring magnetic images from selected documents and an optical image reader for acquiring optical images of selected documents.

5. The apparatus of claim 4 including a system controller for comparing the magnetic image of a selected document to the optical image of the same selected document to verify the accuracy of the magnetic image.

6. The apparatus of claim 1 comprising a printer along the path of movement for printing selected information on selected documents extracted from the envelopes.

7. The apparatus of claim 1 comprising a system controller for controlling operation of the apparatus to enable selected documents imaged by the image acquisition system to be grouped into selected batches of documents.

8. The apparatus of claim 1 wherein the system controller assigns all documents extracted from a single envelope into a single distinct transaction and assigns selected distinct transactions of documents into selected batches of documents.

9. The apparatus of claim 8 wherein the image acquisition system detects whether images of selected documents have selected criteria and assigns transactions having a selected document having the selected criteria to a selected batch of documents and assigns transactions having a selected document having images lacking the selected criteria to a predetermined group of nonconforming documents.

10. The apparatus of claim 9 having a document sorter for sorting the selected transaction having a selected document image having the selected criteria into the selected batch and for sorting the transactions having a document image lacking the selected criteria into a separate output group.

11. The apparatus of claim 1 comprising a document feeder positioned along the path of movement after the extractor for feeding selected documents onto the selected path of movement.

12. The apparatus of claim 11 wherein the document feeder feeds batch identification pieces into the path of movement and wherein the image acquisition system acquires a selected image of the batch identification pieces and wherein the system controller assigns selected documents into a selected batch of documents in response to the batch identification piece.

13. The apparatus of claim 12 wherein the system controller assigns all documents extracted from a single envelope into a single distinct transaction and assigns distinct transactions of documents into selected batches of documents in response to the acquisition of images of the batch identification pieces.

14. The apparatus of claim 1 including an envelope feeder for feeding the envelopes containing the documents onto the document transport and a document feeder positioned along the path of movement downstream from the envelope feeder for feeding predetermined documents into the path of movement.

15. The apparatus of claim 14 wherein the document feeder is positioned downstream of the extractor along the path of movement to feed the predetermined documents into the path of movement of the documents extracted from the envelopes.

16. The apparatus of claim 15 comprising a printer along the path of movement for printing selected information on selected extracted documents.

17. The apparatus of claim 1 wherein the image acquisition system includes an orientation detector for determining the orientation of selected documents along the path of movement.

18. The apparatus of claim 17 including a document orientor positioned along the path of movement following the orientation detector for orienting selected documents into a desired orientation along the path of movement.

19. The apparatus of claim 18 wherein the image acquisition system includes a document image acquisition device for acquiring a selected image of selected documents in the desired orientation along the path of movement.

20. An apparatus for processing documents contained within envelopes comprising:
A) a document transport for conveying documents and envelopes along a selected path of movement;
B) an extractor along the path of movement for extracting the documents from the envelopes;
C) a system controller for controlling operation of the apparatus wherein documents extracted from each envelope are identified as a separate distinct transaction;
D) an image acquisition system along the path of movement for acquiring images of at least selected documents of each transaction;
E) an image storage device for storing the images acquired from the extracted documents; and
F) a document output for conveying selected transactions of documents to a selected output area.

21. The apparatus of claim 20 including an envelope feeder for feeding the envelopes containing the documents onto the document transport and a document feeder positioned along the path of movement downstream from the envelope feeder for feeding predetermined documents into the path of movement.

22. The apparatus of claim 21 wherein the document feeder is positioned downstream from the extractor to feed the predetermined documents into the path of movement of the documents extracted from the envelopes.

23. The apparatus of claim 22 wherein the predetermined documents include a batch identification piece and wherein the system controller designates selected distinct transactions for grouping into at least one selected batch in response to the batch identification piece.

24. The apparatus of claim 23 wherein the image acquisition system includes a document image acquisition device positioned along the path of movement following the document feeder for the batch identification piece so that the document image acquisition device acquires a selected image of the batch identification piece to enable the system controller to designate the selected batch of documents.

25. The apparatus of claim 24 including a printer for printing batch identification information onto selected documents of selected transactions in response to the batch identification piece.

26. The apparatus of claim 20 comprising a printer along the path of movement for printing selected information on selected extracted documents.

27. The apparatus of claim 20 wherein the system controller designates selected distinct transactions of documents for grouping into selected batches.

28. The apparatus of claim 27 wherein the system controller assigns identification information to selected documents and selected transactions and wherein the apparatus includes a printer along the path of movement for printing selected identification information on selected documents.

29. An apparatus for sorting a group of documents into at least one selected batch of documents comprising:
A) a document transport for conveying documents in a serial flow along a selected path of movement;
B) a document feeder located downstream of the serial flow along the selected path of movement for selectively feeding a batch identification piece into the serial flow of documents along the selected path of movement on the document transport for identifying a selected batch of documents;
C) an image acquisition system along the path of movement for acquiring an image of the batch identification piece and selected documents conveyed along the path of movement;
D) an image storage medium for storing images of the batch identification piece and the selected documents; and
E) a system controller for controlling the operation of the apparatus wherein the system controller designates selected documents for grouping into the selected batch in response to the batch identification piece.

30. The apparatus of claim 29 wherein the system controller controls operations of the document feeder to cause the document feeder to feed the batch identification piece into the selected path of movement at a selected time.

31. The apparatus of claim 30 wherein the system controller detects gaps in a flow of documents along the path of movement and causes the document feeder to feed the batch identification piece into the selected path of movement during a gap in the flow of documents.

32. An apparatus for sorting a group of documents into at least one selected batch of documents comprising:

A) a document transport for conveying documents along a selected path of movement;

B) a document feeder for feeding a batch identification piece into the selected path of movement on the document transport for identifying a selected batch of documents;

C) an image acquisition system along the path of movement for acquiring an image of the batch identification piece and selected documents conveyed along the path of movement, the image acquisition system including an orientation detector for determining the orientation of selected documents along the selected path of movement;

D) an image storage medium for storing images of the batch identification piece and the selected documents; and E) a system controller for controlling the operation of the apparatus wherein the controller designates selected documents for grouping into the selected batch in response to the batch identification piece.

33. The apparatus of claim 32 wherein the system controller controls operations of the document feeder to cause the document feeder to feed the batch identification piece into the selected path of movement at a selected time.

34. The apparatus of claim 33 wherein the system controller detects gaps in a flow of documents along the path of movement and causes the document feeder to feed the batch identification piece into the selected path of movement during a gap in the flow of documents.

35. The apparatus of claim 32 comprising a document orientor positioned along the selected path of movement following the orientation detector for orienting selected documents into a desired orientation along the path of movement.

36. The apparatus of claim 35 wherein the image acquisition system includes at least one document image device positioned along the selected path of movement following the document orientor for acquiring images of selected documents in the desired orientation.

37. The apparatus of claim 36 wherein the document image device includes a magnetic reader for reading selected magnetic images from selected documents.

38. The apparatus of claim 37 wherein the document imaging device includes an optical reader for reading optical images of selected documents.

39. The apparatus of claim 36 wherein the document image device includes a magnetic reader for reading magnetic images from selected documents and an optical reader for reading optical images from selected documents, and wherein the system controller compares selected magnetic images to selected optical images of the same document to verify the accuracy of the magnetic images.

40. The apparatus of claim 36 wherein the system controller assigns identification information to selected documents and wherein the apparatus includes a printer along the path of movement for printing selected identification information on selected documents.

41. The apparatus of claim 32 wherein the system controller designates selected sets of successive documents along the path of movement as a distinct transaction and designates selected distinct transactions for grouping into at least one selected batch in response to the batch identification piece.

42. The apparatus of claim 41 wherein the image acquisition system includes a document image acquisition device positioned along the path of movement following the document feeder for the batch identification piece so that the document image acquisition device acquires a selected image of the batch identification piece to enable the system controller to designate a selected batch of documents.

43. The apparatus of claim 42 including a printer for printing batch identification information onto selected documents of selected transactions in response to the batch identification piece.

44. An apparatus for sorting a group of documents into at least one selected batch of documents comprising:

A) a document transport for conveying documents along a selected path of movement;

B) an orientation detector for determining the orientation of selected documents along the selected path of movement;

C) a document orientor for selectively changing the orientation of documents along the path of movement into a desired orientation along the path of movement;

D) an image acquisition system along the path of movement for acquiring an image of selected documents conveyed along the path of movement;

E) an image storage medium for storing images of the selected documents; and

F) a system controller for controlling the operation of the apparatus wherein the system controller designates selected documents for grouping into a selected batch.

45. The apparatus of claim 44 comprising a document feeder for feeding a batch identification piece into the selected path of movement for identifying a selected batch of documents.

46. The apparatus of claim 45 wherein the document feeder is located along the path of movement and wherein the system controller detects gaps in a flow of documents along the path of movement and causes the document feeder to feed the batch identification piece into the selected path of movement during a gap in the flow of documents.

47. The apparatus of claim 44 wherein the image acquisition system includes at least one document image device positioned along the selected path of movement following the document orientor for acquiring images of selected documents in the desired orientation.

48. The apparatus of claim 47 wherein the document image device includes a magnetic reader for reading selected magnetic images from selected documents.

49. The apparatus of claim 47 wherein the document imaging device includes an optical reader for reading optical images of selected documents.

50. The apparatus of claim 47 wherein the document image device includes a magnetic reader for reading magnetic images from selected documents and an optical reader for reading optical images of selected documents and wherein the system controller compares selected magnetic images to selected optical images from the same document to verify the accuracy of the magnetic images.

51. The apparatus of claim 44 wherein the system controller assigns identification information to selected documents and wherein the apparatus includes a printer along the path of movement for printing selected identification information on selected documents.

52. The apparatus of claim 44 wherein the system controller designates selected sets of successive documents along the path of movement as a distinct transaction and designates selected distinct transactions for grouping into at least one selected batch.

53. The apparatus of claim 44 comprising a document feeder for feeding a batch identification piece into the selected path of movement for identifying a selected batch of documents and wherein the image acquisition system includes a document image acquisition device positioned along the path of movement following the document feeder for the batch identification piece so that the document image acquisition device acquires a selected image of the batch identification piece to enable the system controller to designate a selected batch of documents.

54. The apparatus of claim 53 including a printer for printing batch identification information onto selected documents of selected transactions in response to the batch identification piece.

55. The apparatus of claim 44 wherein the document orientor orients documents from back to front and from upside down to right side up.

56. The apparatus of claim 55 wherein the document orientor changes the order of successive documents along the path of movement to enable a trailing document to become a leading document and a leading document to become a trailing document along the selected path of movement.

57. The apparatus of claim 44 wherein the orientation detector includes a magnetic reader for reading a selected magnetic image on selected documents to determine the orientation of selected documents along the selected path of movement.

58. The apparatus of claim 44 wherein the orientation detector includes an optical reader for reading a selected optical image from selected documents to determine the orientation of selected documents along the selected path of movement.

59. The apparatus of claim 44 wherein the image acquisition system includes a magnetic reader for reading magnetic characters from selected documents.

60. The apparatus of claim 59 wherein the image acquisition system includes an optical reader for reading optical characters from selected documents.

61. The apparatus of claim 60 wherein the image storage medium includes a non-volatile storage medium for storing the optical characters read by the optical reader and the magnetic characters read by the magnetic reader.

62. An apparatus for sorting a group of documents contained within envelopes into selected batches of documents comprising:
- A) a document transport for conveying documents and envelopes containing documents along a selected path of movement;
- B) an envelope feeder for feeding envelopes containing documents onto the document transport;
- C) an extractor positioned along the path of movement for extracting the documents from the envelopes;
- D) a system controller for identifying the documents extracted from each respective envelope as a single transaction along the path of movement;
- E) an orientation detector for determining the orientation of documents along the path of movement;
- F) a document orientor for selectively changing the orientation of documents along the path of movement into a desired orientation along the path of movement;
- G) a document feeder positioned downstream from the envelope feeder along the path of movement for selectively feeding batch identification pieces into the path of movement;
- H) an image acquisition device for acquiring an image of the batch identification pieces and selected documents conveyed along the path of movement to enable the system controller to assign documents of selected transactions into selected batches;
- I) an image storage medium for storing the acquired images of the batch identification pieces and the selected documents; and
- J) a document sorter for sorting documents of respective batches into selected output areas.

63. The apparatus of claim 62 comprising a printer positioned along the path of movement for printing batch identification information on selected documents in response to the batch identification pieces conveyed along the path of movement.

64. The apparatus of claim 62 wherein the document orientor orients documents from back to front and from upside down to right side up.

65. The apparatus of claim 62 wherein the document orientor changes the order of successive documents along the path of movement to enable a trailing document to become a leading document and a leading document to become a trailing document along the selected path of movement.

66. The apparatus of claim 62 wherein the orientation detector includes a magnetic reader for reading a selected magnetic image on selected documents to determine the orientation of selected documents along the selected path of movement.

67. The apparatus of claim 62 wherein the orientation detector includes an optical reader for acquiring a selected optical image from selected documents to determine the orientation of selected documents along the selected path of movement.

68. The apparatus of claim 62 wherein the image acquisition device includes a magnetic reader for reading magnetic characters from selected documents.

69. The apparatus of claim 68 wherein the image acquisition device includes an optical reader for reading optical characters from selected documents.

70. The apparatus of claim 69 wherein the system controller compares magnetic characters read from a selected document with optical characters read from the same document to verify the accuracy of the magnetic characters.

71. The apparatus of claim 69 wherein the image storage medium includes a non-volatile storage medium for storing the optical characters read by the optical reader and the magnetic characters read by the magnetic reader.

72. An apparatus for sorting a group of documents contained within envelopes into selected batches of documents comprising:
- A) a document transport for conveying documents and envelopes containing documents along a selected path of movement;
- B) an envelope feeder for feeding envelopes containing documents onto the document transport;
- C) an extractor positioned along the path of movement for extracting the documents from the envelopes;
- D) a system controller for identifying the documents extracted from each respective envelope as a single transaction along the path of movement;
- E) an orientation detector for determining the orientation of documents along the path of movement;

F) a document orientor for selectively changing the orientation of documents along the path of movement into a desired orientation along the path of movement;

G) an image acquisition device for acquiring an image of selected documents conveyed along the path of movement to enable the system controller to assign selected transactions of documents into selected batches;

H) an image storage medium for storing the acquired images of the selected documents; and I) a document sorter for sorting documents of respective batches into selected output areas.

73. The apparatus of claim 72 comprising a printer positioned along the path of movement for printing batch identification information on selected documents.

74. The apparatus of claim 72 wherein the document orientor orients documents from back to front and from upside down to right side up.

75. The apparatus of claim 72 wherein the document orientor changes the order of successive documents along the path of movement to enable a trailing document to become a leading document and a leading document to become a trailing document along the selected path of movement.

76. The apparatus of claim 72 wherein the orientation detector includes a magnetic reader for reading a selected magnetic image on selected documents to determine the orientation of selected documents along the selected path of movement.

77. The apparatus of claim 72 wherein the orientation detector includes an optical reader for reading a selected optical image from selected documents to determine the orientation of selected documents along the selected path of movement.

78. The apparatus of claim 72 wherein the image acquisition device includes a magnetic reader for reading magnetic characters from selected documents.

79. The apparatus of claim 78 wherein the image acquisition device includes an optical reader for reading optical characters from selected documents.

80. The apparatus of claim 79 wherein the system controller compares magnetic characters read from a selected document with optical characters read from the same document to verify the accuracy of the magnetic characters.

81. The apparatus of claim 79 wherein the image storage medium includes a non-volatile storage medium for storing the optical characters read by the optical reader and the magnetic characters read by the magnetic reader.

82. The apparatus of claim 72 comprising a document feeder positioned downstream from the envelope feeder along the path of movement for selectively feeding batch identification pieces into the path of movement and wherein the image acquisition device acquires a selected image of the batch identification pieces and wherein the system controller assigns selected transactions into selected batches in response to the batch identification pieces.

83. A method for processing documents contained within envelopes comprising:

A) conveying documents and envelopes along a selected path of movement;

B) extracting the documents from the envelopes along the path of movement;

C) acquiring images of at least selected documents extracted from the envelopes and conveyed along the path of movement; and D) storing images of the selected documents acquired by the image acquisition device in a non-volatile image storage medium.

84. The method of claim 83 wherein the step of acquiring images includes acquiring magnetic images from selected documents and acquiring optical images of selected documents.

85. The method of claim 84 including the steps of comparing the magnetic image of the same selected document to the optical image of a selected document to verify the accuracy of the magnetic image.

86. The method of claim 83 comprising the step of printing selected information on selected documents extracted from the envelopes along the path of movement.

87. The method of claim 83 comprising the step of grouping selected documents into selected batches of documents.

88. The method of claim 83 including the steps of assigning all documents extracted from a single envelope into a single distinct transaction and assigning selected distinct transactions of documents into selected batches of documents.

89. The method of claim 88 comprising the steps of detecting whether images of selected documents have selected criteria; assigning transactions having a selected document having the selected criteria to a selected batch of documents; and assigning transactions having a selected document having images lacking the selected criteria to a predetermined group of nonconforming documents.

90. The method of claim 89 including the steps of sorting the selected transaction having a selected document image having the selected criteria into the selected batch; and sorting the transactions having a document image lacking the selected criteria into a separate output group.

91. The method of claim 83 comprising the steps of feeding batch identification pieces into the path of movement; acquiring a selected image of the batch identification pieces; and assigning selected documents into a selected batch of documents in response to the batch identification piece.

92. The method of claim 91 comprising the steps of assigning all documents extracted from a single envelope into a single distinct transaction and assigning distinct transactions of documents into selected batches of documents in response to the acquisition of images of the batch identification pieces.

93. The method of claim 83 including feeding the envelopes containing the documents along the path of movement and feeding predetermined documents into the path of movement following the feeding of the envelopes along the path of movement.

94. The method of claim 83 including the step of determining the orientation of selected documents along the path of movement.

95. The method of claim 94 including the step of orienting selected documents into a desired orientation along the path of movement in response to detecting the orientation of the selected documents.

96. The method of claim 95 including the step of acquiring a selected image of selected documents in the desired orientation along the path of movement.

97. A method for processing documents contained within envelopes comprising:

A) conveying documents and envelopes along a selected path of movement;

B) extracting the documents from the envelopes along the path of movement;

C) identifying documents extracted from each envelope as a separate distinct transaction;

D) acquiring images of at least selected documents of each transaction along the path of movement;

E) storing the images acquired from the extracted documents; and

F) conveying selected transactions of documents to a selected output area.

98. The method of claim 97 including the step of feeding the envelopes containing the documents along the path of movement and feeding predetermined documents into the path of movement following the feeding of the envelopes along the path of movement.

99. The method of claim 97 comprising the step of printing selected information on selected extracted documents.

100. The method of claim 97 comprising the step of designating selected distinct transactions of documents for grouping into selected batches.

101. The method of claim 100 comprising the steps of assigning identification information to selected documents and selected transactions; and printing selected identification information on selected documents along the path of movement.

102. The method of claim 97 including the step of feeding a batch identification piece along the path of movement and designating selected distinct transactions for grouping into at least one selected batch in response to the batch identification piece.

103. The method of claim 102 including the step of printing batch identification information onto selected documents of selected transactions in response to the batch identification piece.

104. A method for sorting a group of documents into at least one selected batch of documents comprising:

A) conveying documents in a serial flow along a selected path of movement;

B) selectively feeding a batch identification piece into the serial flow of documents along the selected path of movement for identifying a selected batch of documents;

C) acquiring an image of the batch identification piece and selected documents conveyed along the path of movement;

D) storing images of the batch identification piece and the selected documents; and E) designating selected documents for grouping into the selected batch in response to the batch identification piece.

105. The method of claim 104 including the steps of detecting gaps in a flow of documents along the path of movement and feeding the batch identification piece into the selected path of movement during a gap in the flow of documents.

106. A method for sorting a group of documents into at least one selected batch of documents comprising:

A) conveying documents along a selected path of movement;

B) feeding a batch identification piece into the selected path of movement for identifying a selected batch of documents;

C) acquiring an image of the batch identification piece and selected documents conveyed along the path of movement;

D) determining the orientation of selected documents along the selected path of movement;

E) storing images of the batch identification piece and the selected documents; and F) designating selected documents for grouping into the selected batch in response to the batch identification piece.

107. The method of claim 106 including the steps of detecting gaps in a flow of documents along the path of movement and feeding to feed the batch identification piece into the selected path of movement during a gap in the flow of documents.

108. The method of claim 106 including the steps of orienting selected documents into a desired orientation along the path of movement in response to determining the orientation of the selected documents.

109. The method of claim 108 including the step of acquiring images of selected documents in the desired orientation.

110. The method of claim 109 including the steps of reading magnetic images from selected documents; reading optical images from selected documents; and comparing selected magnetic images to selected optical images of the same document to verify the accuracy of the magnetic images.

111. The method of claim 106 including the steps of assigning identification information to selected documents and printing selected identification information on selected documents along the path of movement.

112. The method of claim 106 including the steps of designating selected sets of successive documents along the path of movement as a distinct transaction and designating selected distinct transactions for grouping into at least one selected batch in response to the batch identification piece.

113. The method of claim 112 including the step of printing batch identification information onto selected documents of selected transactions in response to the batch identification piece.

114. A method for sorting a group of documents into at least one selected batch of documents comprising:

A) conveying documents along a selected path of movement;

B) determining the orientation of selected documents along the selected path of movement;

C) selectively changing the orientation of documents along the path of movement into a desired orientation along the path of movement;

D) acquiring an image of selected documents conveyed along the path of movement;

E) storing images of the selected documents; and

F) designating selected documents for grouping into a selected batch.

115. The method of claim 114 comprising the step of feeding a batch identification piece into the selected path of movement for identifying a selected batch of documents.

116. The method of claim 115 including the steps of detecting gaps in a flow of documents along the path of movement and feeding the batch identification piece into the selected path of movement during a gap in the flow of documents.

117. The method of claim 114 wherein the step of acquiring an image includes the step of acquiring images of selected documents in the desired orientation.

118. The method of claim 114 including the steps of reading magnetic images from selected document; reading optical images of selected documents; and comparing selected magnetic images to selected optical images from the same document to verify the accuracy of the magnetic images.

119. The method of claim 114 including the steps of assigning identification information to selected documents and printing selected identification information on selected documents along the path of movement.

120. The method of claim 114 including the steps of designating selected sets of successive documents along the path of movement as a distinct transaction and designating selected distinct transactions for grouping into at least one selected batch.

121. The method of claim 114 comprising the steps of feeding a batch identification piece into the selected path of movement for identifying a selected batch of documents and acquiring a selected image of the batch identification piece to enable a designation of a selected batch of documents.

122. The method of claim 121 including the step of printing batch identification information onto selected documents of selected transactions in response to the batch identification piece.

123. The method of claim 114 wherein the step of selectively changing the orientation of documents includes the step of orienting documents from back to front and from upside down to right side up.

124. The method of claim 114 wherein the step of selectively changing the orientation of documents includes the step of changing the order of successive documents along the path of movement to enable a trailing document to become a leading document and a leading document to become a trailing document along the selected path of movement.

125. The method of claim 114 wherein the step of determining the orientation of selected documents includes reading a selected magnetic image on selected documents to determine the orientation of selected documents along the selected path of movement.

126. The method of claim 114 wherein the step of determining the orientation of selected documents includes reading a selected optical image from selected documents to determine the orientation of selected documents along the selected path of movement.

127. The method of claim 114 wherein the step of acquiring an image includes reading magnetic characters from selected documents.

128. The method of 127 wherein the step of acquiring an image includes reading optical characters from selected documents.

129. The method of claim 128 wherein the step of storing images includes storing the optical characters read by the optical reader and the magnetic characters read by the magnetic reader in a non-volatile storage medium.

130. A method for sorting a group of documents contained within envelopes into selected batches of documents comprising:
A) conveying documents and envelopes containing documents along a selected path of movement;
B) feeding envelopes containing documents along the path of movement;
C) extracting the documents from the envelopes along the path of movement;
D) identifying the documents extracted from each respective envelope as a single transaction along the path of movement;
E) determining the orientation of documents along the path of movement;
F) selectively changing the orientation of documents along the path of movement into a desired orientation along the path of movement;
G) selectively feeding batch identification pieces into the path of movement;
H) acquiring an image of the batch identification pieces and selected documents conveyed along the path of movement to assign documents of selected transactions into selected batches;
I) storing the acquired images of the batch identification pieces and the selected documents; and
J) sorting documents of respective batches into selected output areas.

131. The method of claim 130 comprising the step of printing batch identification information on selected documents in response to the batch identification pieces conveyed along the path of movement.

132. The method of claim 131 wherein the step of determining the orientation of documents includes reading a selected magnetic image on selected documents to determine the orientation of selected documents along the selected path of movement.

133. The method of claim 131 wherein the step of determining the orientation of documents includes acquiring a selected optical image from selected documents to determine the orientation of selected documents along the selected path of movement.

134. The method of claim 131 wherein the step of acquiring an image includes reading magnetic characters from selected documents.

135. The method of claim 134 wherein the step of acquiring an image includes reading optical characters from selected documents.

136. The method of claim 135 including the step of comparing magnetic characters read from a selected document with optical characters read from the same document to verify the accuracy of the magnetic characters.

137. The method of claim 135 including the step of storing the optical characters read by the optical reader and the magnetic characters read by the magnetic reader in a non-volatile storage medium.

138. The method of claim 130 wherein the step of changing the orientation of documents includes orienting documents from back to front and from upside down to right side up along the path of movement.

139. The method of claim 130 wherein the step of changing the orientation of documents includes changing the order of successive documents along the path of movement to enable a trailing document to become a leading document and a leading document to become a trailing document along the selected path of movement.

140. A method for sorting a group of documents contained within envelopes into selected batches of documents comprising:
A) conveying documents and envelopes containing documents along a selected path of movement;
B) feeding envelopes containing documents along the selected path of movement;
C) extracting the documents from the envelopes along the path of movement;
D) identifying the documents extracted from each respective envelope as a single transaction along the path of movement;
E) determining the orientation of documents along the path of movement;
F) selectively changing the orientation of documents along the path of movement into a desired orientation along the path of movement;
G) acquiring an image of selected documents conveyed along the path of movement to assign selected transactions of documents into selected batches;
H) storing the acquired images of the selected documents; and I) sorting documents of respective batches into selected output areas.

141. The method of claim 140 comprising the step of printing batch identification information on selected documents.

142. The method of claim 140 wherein the step of selectively changing the orientation of documents includes orienting documents from back to front and from upside down to right side up.

143. The method of claim 140 wherein the step of selectively changing the orientation of documents includes changing the order of successive documents along the path of movement to enable a trailing document to become a leading document and a leading document to become a trailing document along the selected path of movement.

144. The method of claim 140 wherein the step of determining the orientation of documents includes reading a selected magnetic image on selected documents to determine the orientation of selected documents along the selected path of movement.

145. The method of claim 140 wherein the step of determining the orientation of documents includes reading a selected optical image from selected documents to determine the orientation of selected documents along the selected path of movement.

146. The method of claim 140 wherein the step of acquiring an image includes reading magnetic characters from selected documents.

147. The method of claim 146 wherein the step of acquiring an image includes reading optical characters from selected documents.

148. The method of claim 147 including the step of comparing magnetic characters read from a selected document with optical characters read from the same document to verify the accuracy of the magnetic characters.

149. The method of claim 147 wherein the step of storing the acquired images includes storing the optical characters read by the optical reader and the magnetic characters read by the magnetic reader.

150. The method of claim 140 comprising the steps of selectively feeding batch identification pieces into the path of movement; acquiring a selected image of the batch identification pieces; and assigning selected transactions into selected batches in response to the batch identification pieces.

* * * * *